(12) United States Patent
Iyer et al.

(10) Patent No.: US 10,972,387 B2
(45) Date of Patent: Apr. 6, 2021

(54) APPLICATION PERFORMANCE BASED PATH-SELECTION USING DYNAMIC METRICS

(71) Applicant: Versa Networks, Inc., San Jose, CA (US)

(72) Inventors: Sridhar Vishwanathan Iyer, Fremont, CA (US); Amey Gavand, San Jose, CA (US); Akshay Adhikari, San Jose, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 4 days.

(21) Appl. No.: 16/442,406

(22) Filed: Jun. 14, 2019

(65) Prior Publication Data
US 2019/0386918 A1    Dec. 19, 2019

Related U.S. Application Data

(60) Provisional application No. 62/686,003, filed on Jun. 16, 2018.

(51) Int. Cl.
*H04L 12/715* (2013.01)
*H04L 12/851* (2013.01)
(Continued)

(52) U.S. Cl.
CPC .......... *H04L 45/64* (2013.01); *H04L 41/5009* (2013.01); *H04L 43/0829* (2013.01);
(Continued)

(58) Field of Classification Search
CPC . H04L 45/64; H04L 47/2425; H04L 43/0852; H04L 45/24; H04L 41/5009; H04L 69/163; H04L 43/0829; H04L 45/123; H04L 45/70; H04L 41/12; H04L 43/08
See application file for complete search history.

(56) References Cited

U.S. PATENT DOCUMENTS 10,142,241 B1   11/2018 Vanloon et al.
10,355,989 B1    7/2019 Panchal et al.
(Continued)

OTHER PUBLICATIONS

IEEE: An SD-WAN Solution Assuring Business Quality VoIP Communication for Home Based Employees; Damian Radcliffe, Eoghan Furey, Juanita Blue. (Year: 2019).*
(Continued)

*Primary Examiner* — Robert C Scheibel
*Assistant Examiner* — Mohammed S Chowdhury
(74) *Attorney, Agent, or Firm* — Loza & Loza, LLP

(57) ABSTRACT

Embodiments herein disclose methods for selecting one or more paths for routing application traffic based on application performance metrics for hosted applications. In an embodiment, to select the best path, the available paths can be monitored to understand the performance of specific applications through those paths. Subsequently, the performance data is used to derive an application link score for any given combination of application and path, wherein the application link score is generated as a function of packet delay and packet loss. The ALS is then be used to determine the best path for a given application.

16 Claims, 13 Drawing Sheets

(51) Int. Cl.
*H04L 12/26* (2006.01)
*H04L 12/707* (2013.01)
*H04L 12/24* (2006.01)
*H04L 29/06* (2006.01)

(52) U.S. Cl.
CPC .......... *H04L 43/0852* (2013.01); *H04L 45/24* (2013.01); *H04L 47/2425* (2013.01); *H04L 69/163* (2013.01)

(56) References Cited

U.S. PATENT DOCUMENTS

| | | |
|---|---|---|
| 2006/0146703 A1 | 7/2006 | Cha et al. |
| 2015/0236945 A1* | 8/2015 | Michael ................. H04L 45/24 370/238 |
| 2016/0007218 A1 | 1/2016 | Bhagavatula et al. |
| 2016/0080250 A1* | 3/2016 | Ramachandran ..... H04L 67/141 709/226 |
| 2017/0346722 A1 | 11/2017 | Smith et al. |
| 2018/0331946 A1 | 11/2018 | Olofsson et al. |
| 2019/0036814 A1* | 1/2019 | Aranha ................. H04L 47/825 |
| 2019/0036828 A1* | 1/2019 | Bajaj ..................... H04L 45/123 |
| 2019/0334820 A1 | 10/2019 | Zhao |
| 2019/0349259 A1* | 11/2019 | Rovner .................. H04L 45/02 |

OTHER PUBLICATIONS

IEEE: Network utilization optimizer for SD-WAN;L Vdovin, P Likin, A Vilchinskii, MERA (Year: 2014).*
Non-Final Office Action U.S. Appl. No. 16/384,681; 93 pages (dated Sep. 17, 2020).

* cited by examiner

APPLICATION PERFORMANCE BASED PATH-SELECTION USING DYNAMIC METRICS

TECHNICAL FIELD

The embodiments herein relate to network path selection and, more particularly, to network path selection based on application specific performance metrics.

BACKGROUND

Modern businesses with distributed branches, such as banks or retail locations, are typically interconnected via an enterprise wide area network (WAN). The WAN can be implemented as a physical network or can be implemented in software as an overlay network on top of the physical network. Such a network would consist of hundreds or thousands of nodes, with some designated hub nodes acting as gateways for other nodes in the network. For example, an enterprise WAN of a bank might have an east coast hub to which hundreds of bank branches along the east coast are connected and a west coast hub to which hundreds of banks branches along the west coast are connected. In such an interconnected network, there are possibly many paths possible for users' traffic to be routed through nodes in the WAN to its final destination. And the best path for a given traffic may vary dynamically.

Network path selection involves applying a metric to decide on the best path to choose from available options. The nature of the metric used for path selection may vary depending on the need for path selection. For example, performance-based path selection involves using one or more performance metrics to choose the best available path.

Typically, for available paths between any two nodes in a network, the performance of the paths can be monitored using active or passive monitoring techniques. Active monitoring involves injecting test packets into the network environment through the various paths and measuring performance based on standard performance parameters. And, passive monitoring involves monitoring network traffic data over a period of time to understand the performance of different paths. A metric is derived based on the performance and is compared for different available paths to choose the best path.

Active monitoring can increase the load on network infrastructure and is not ideal in all circumstances. And, passive monitoring can involve collecting large volumes of data and may be limited by the fact that monitoring can only happen on the part of the network that is visible to the node monitoring the traffic. Further, as networks become more dynamic in nature, the monitoring mechanism that is more suitable can change based on changing conditions in the network. Furthermore, as networks become more complex and dynamic, the mechanisms for path selection must be adaptable to changing conditions in the network as well. For example, in enterprise wide WAN networks, particularly those that are software defined (e.g., Software Defined Wide Area Network (SD-WAN)), the configuration of the network can change from time to time depending on the network policies. The monitoring and path selection criteria must adapt to changes accordingly. Still further, the mechanisms for performance based path selection should be applicable to applications hosted outside of the network. For example, in an SD-WAN network, path selection mechanisms should apply to Internet hosted applications, sometimes referred to as Software as a Service (SaaS) applications.

BRIEF DESCRIPTION OF THE FIGURES

The embodiments herein will be better understood from the following detailed description with reference to the drawings, in which.

DETAILED DESCRIPTION OF EMBODIMENTS

Figure 1:
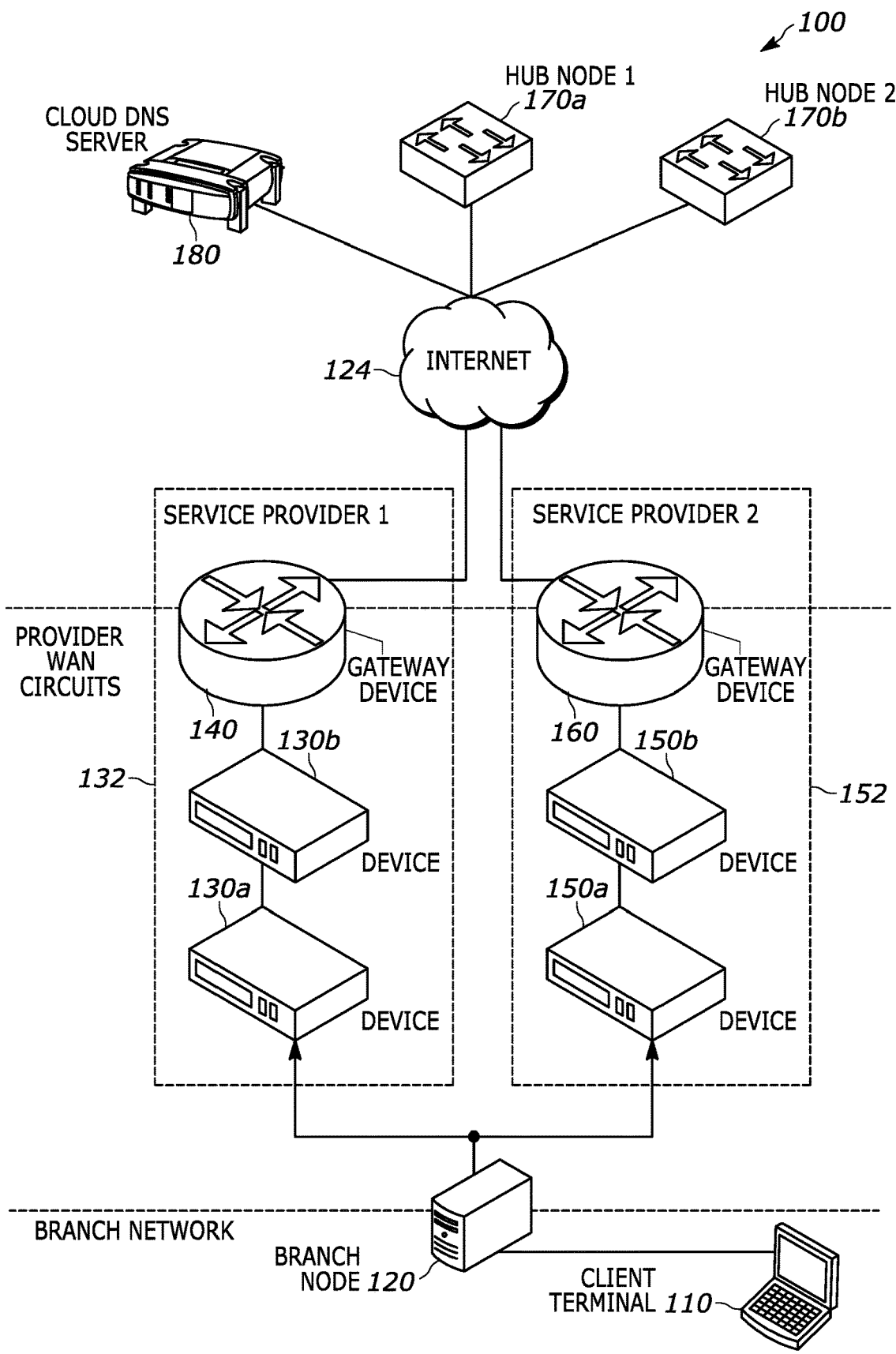
FIG. 1 is a schematic illustrating an example topology used to illustrate the methods disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods for selecting one or more paths for routing application traffic (also referred to as auto steering) based on application performance metrics for hosted applications (also referred to herein as, Software as a Service or SaaS applications and/or Internet-hosted applications). In an embodiment, a hosted application can be an application (e.g., MICROSOFT OFFICE 365 OR DROPBOX) that is hosted on a server that is accessed by clients through, for example, the Internet, an intranet, a private LAN, or through a cloud, such as a public cloud, a private cloud, and/or a hybrid cloud. Further, embodiments herein are described in the context of a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more WAN links. However, one skilled in the relevant art will recognize, in light of the description herein, that embodiments disclosed herein can be applied in non-software-defined WANs and for applications hosted within the network, e.g., within a LAN.

Referring now to the drawings, and more particularly to FIGS. 1 through 7, where similar reference characters may denote corresponding features consistently throughout the figures, there are shown embodiments.

FIG. 1 is a schematic illustrating an example topology used to illustrate the methods disclosed herein. The example topology shows a branch network with a plurality of devices such as the client terminal 110 having access to the Internet 124 through the branch node 120 using two links through different service providers (Service Provider 1 132 and Service Provider 2 152) via their respective WAN circuits. In the example topology, the WAN circuits can be part of an overlay network that includes the hub nodes Hub Node 1 170a and Hub Node 2 170b. Also shown in FIG. 1 is a cloud Domain Name Server (DNS) server 180 for serving DNS requests. Each of the WAN circuits can have a plurality of routing devices. For example, the network of Service Provider 1 has a plurality of devices 130a, 130b performing networking functions and at least one gateway routing device 140. Similarly, the network of Service Provider 2 has a plurality of devices 150a, 150b performing networking functions and at least one gateway routing device 160.

As illustrated in FIG. 1, branches can be configured with Direct Internet Access (DIA) connections, using single or multiple broadband circuits connected directly to the branch nodes. In such scenarios, there may be various candidates for the best path to a SaaS application including but not limited to a direct connection from the branch, or through another node deployed as a cloud interconnection hub. Such hubs may be deployed in a variety of locations, for example, a third party data center, an Internet interconnection, a hosting facility, or the data center of the SaaS application provider.

In a preferred embodiment, to select the best path, the available paths can be monitored to understand the performance of specific applications through those paths. Subsequently, the performance data can be used to derive an application link score (ALS) (sometimes referred to as the "ALS score") for a given combination of application and path. The ALS score can then be used to determine the best path for a given application. In an embodiment, the ALS score may be derived as a function of parameters that include a Mean Opinion Score (MOS) score, latency, packet loss, latency plus packet loss, and/or monetary cost. For example, a score that takes into account latency and jitter could be: ALS score=(latency+2*jitter). Techniques for calculating an application link score (ALS) are described in more detail below.

Figure 2:
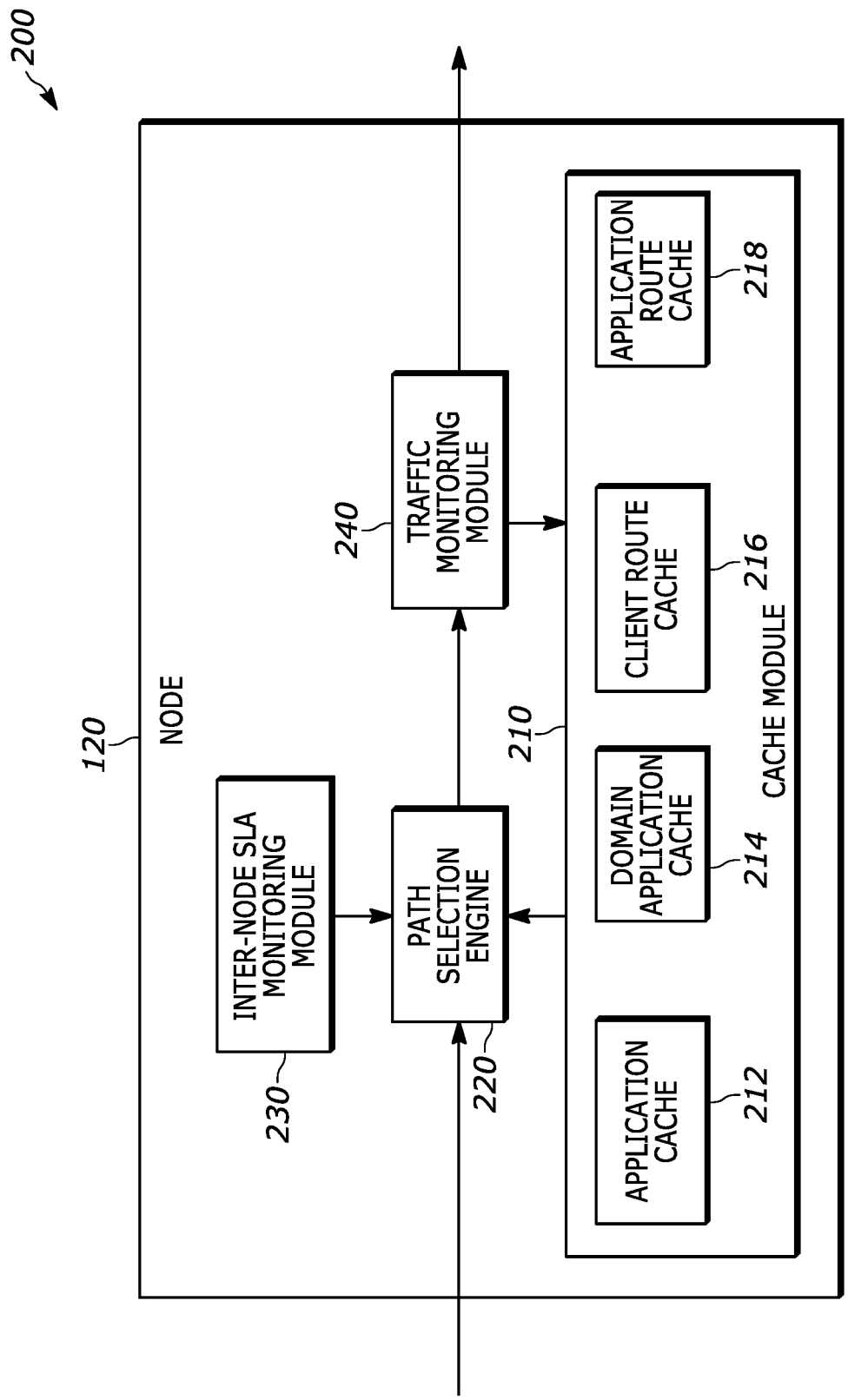
FIG. 2 is a block diagram of a branch node, according to embodiments herein.

FIG. 2 is a block diagram of a node 120, which may be a branch node or a hub node, according to an embodiment herein. The node 120 includes a cache module 210 with various caches (e.g., application cache (AC) 212, domain application cache (DAC) 214, client route cache (CRC) 216, and application route cache (ARC) 218) to store mapping information, a path selection engine 220 for performing path selection for DNS and data session traffic, an inter-node SLA (service level agreement) monitoring module 230 between nodes (e.g., hub-hub, hub-branch, or branch-branch nodes), and a traffic monitoring module 240 for monitoring traffic. The functionality of the each of the modules will be described in the context of the methods described herein. Additionally, each or the modules may be implemented through computer-readable instructions that are executed on a physical processor of a computing system that supports the node.

Eligible Paths

Figure 3:
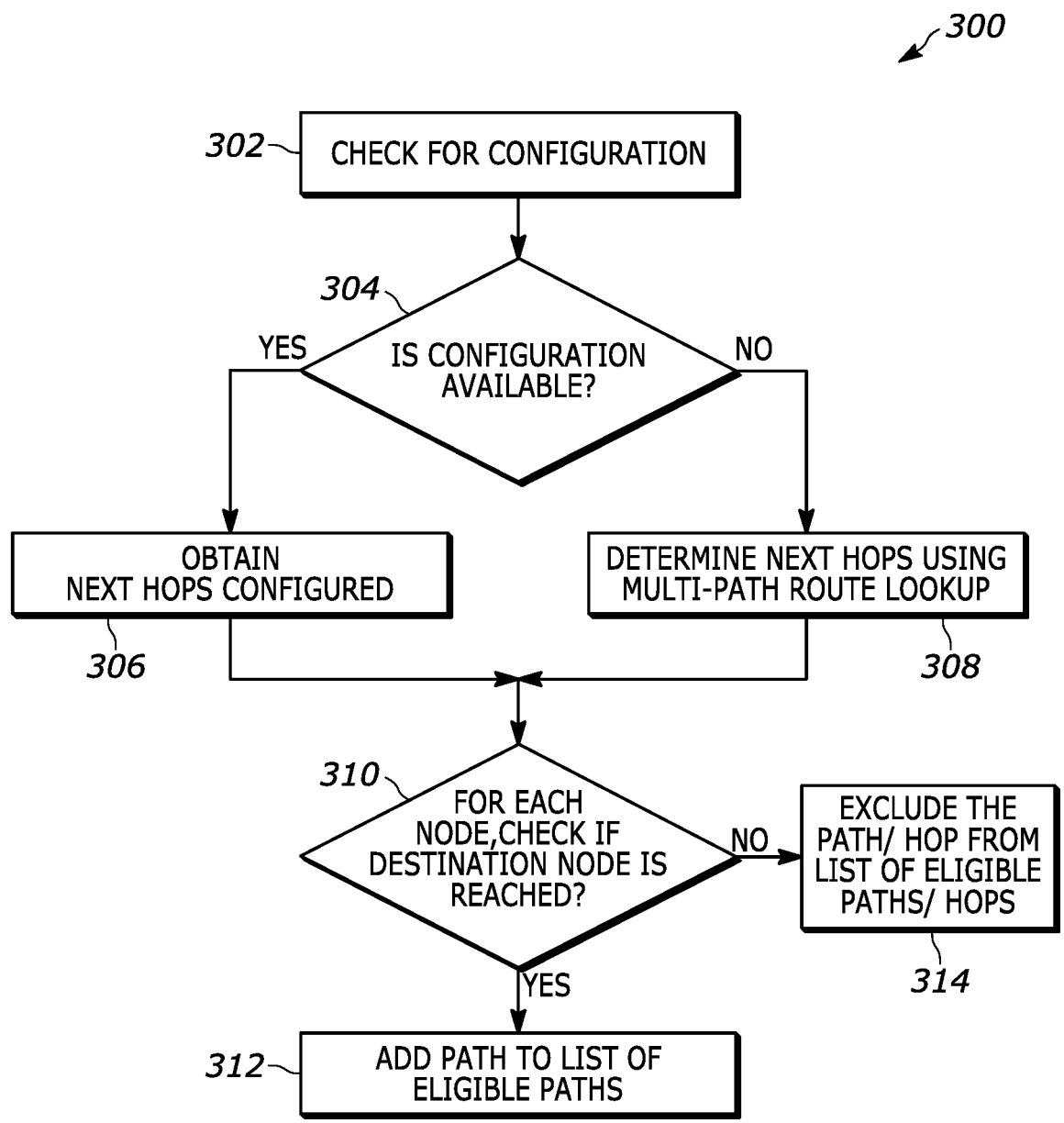
FIG. 3 is a flow diagram illustrating an example of a method for identifying eligible paths from a given node to a node hosting an application of interest, according to embodiments herein.

FIG. 3 is a flow diagram illustrating an example of a method for identifying eligible paths from a given node to a node hosting an application of interest. Typically, when application related traffic is identified, a node (e.g., an originating node) can look for a configuration to check if next hop nodes are configured (step 302). For example, a configuration may be implemented as an SD-WAN forwarding profile that includes indications of next hop priorities. If such a configuration is available (decision point 304), the configured next hop nodes are obtained from the configuration (step 306). For each of the next hop nodes, further next hop nodes are obtained until the destination node is reached (decision point 310). Once the destination node is reached, the path traced through the various nodes is added to a list of eligible paths (step 312). Returning back to decision point 304, if the next hops configuration is not found on a node, then a multi-path route look procedure can be used (step 308) to determine the next hops for the node (also referred to as route based path) and the process proceeds to decision point 310. If a destination node is not reached, the path/hop is excluded from the list of eligible paths/hops (step 314).

In various embodiments, where there is path brownout (e.g., a temporary total loss of service), a next hop can be taken out of the rotation. For example, taking a path out of the rotation may involve excluding a path from consideration in a round-robin load balancing selection algorithm.

Local breakout paths (e.g., paths that can access an application directly over the Internet without passing through a hub node of the SD-WAN) can be used in either routing mode or as explicitly configured next hops. For example, for a route based path, an ICMP monitor can be attached to a path, and the route advertised via that path can be withdrawn from a list of eligible paths when the monitor goes down. Similarly, an explicitly configured next hop can be taken out of the rotation (e.g., taken out of a list of eligible paths) when a monitor attached to it goes down. When a path is taken out of the rotation, any path affinity to that path, e.g., established via a CRC entry, also becomes invalid and is not honored. New sessions which would have used the stale path now go through a fresh path selection decision instead.

A path via a hub node can be taken out of the rotation (e.g., taken out of a list of eligible paths) when all paths to the hub node are declared as down by site to site SLA monitoring. For example, with regard to FIG. 1, if all paths from branch node 120 to hub node 2 170b are down, then all paths that traverse hub node 2 170b can be taken out of the rotation.

The various actions in method 300 may be performed in the order presented, in a different order or simultaneously. Further, in some embodiments, some actions listed in FIG. 3 may be omitted.

Application Link Score (ALS)

The performance data for the various eligible paths may be obtained through passive or active monitoring.

Passive monitoring, in an example embodiment, involves collecting various transport layer (Layer 4 of the Open System Interconnect (OSI) model) as well as application layer (Layer 7 of the OSI model) metrics for Transmission Control Protocol (TCP) based application sessions transiting the node and/or appliance. The metrics can include, for example, at least network and server response times and packet loss estimates in each direction. Passive monitoring can happen at both branch and hub nodes.

In other embodiments of passive monitoring, path selection can be based on performance metrics such as the Mean Opinion Score (MOS), for example, for voice traffic. For UDP based applications, various metrics, in combination with MOS or otherwise, can be used for path selection including but not limited to transaction times for UDP based protocols, a pre-defined metric such as apdex score (e.g., Application Performance Index, which is an open standard for measuring user satisfaction with response time of web applications), application specific metrics such as DNS response time (for DNS traffic), and user-defined metrics.

In an embodiment, active monitoring involves using active monitoring probes to measure responsiveness of applications. The active monitoring probes can be based on but not limited to ICMP, TCP or HTTP based. For example, HTTP requests can be placed on the server of an application to understand the response performance of the application on a specific path. The active monitoring can be done at pre-configured intervals. Further, in various embodiments, the interval is dynamically configurable (for example, through a command line interface or a web interface on the node).

In a preferred embodiment, hub nodes perform both active monitoring and passive monitoring of application traffic, and branch nodes perform passive monitoring of application traffic. Further, branch and hub nodes may perform active monitoring of the network between them using any suitable means, shown in the embodiment of FIG. 2 as inter-node SLA monitoring. In an embodiment, hub nodes export active monitoring data to various branch nodes using one or more existing protocols for exchanging information between nodes (for example, border gateway protocol (BGP)). Branch nodes can combine the active monitoring data from hub nodes, active monitoring data between the branch and hub, and the passive monitoring data available locally to determine overall performance of an application through a particular path.

In some embodiments, branch nodes can also perform active monitoring.

Figure 4:
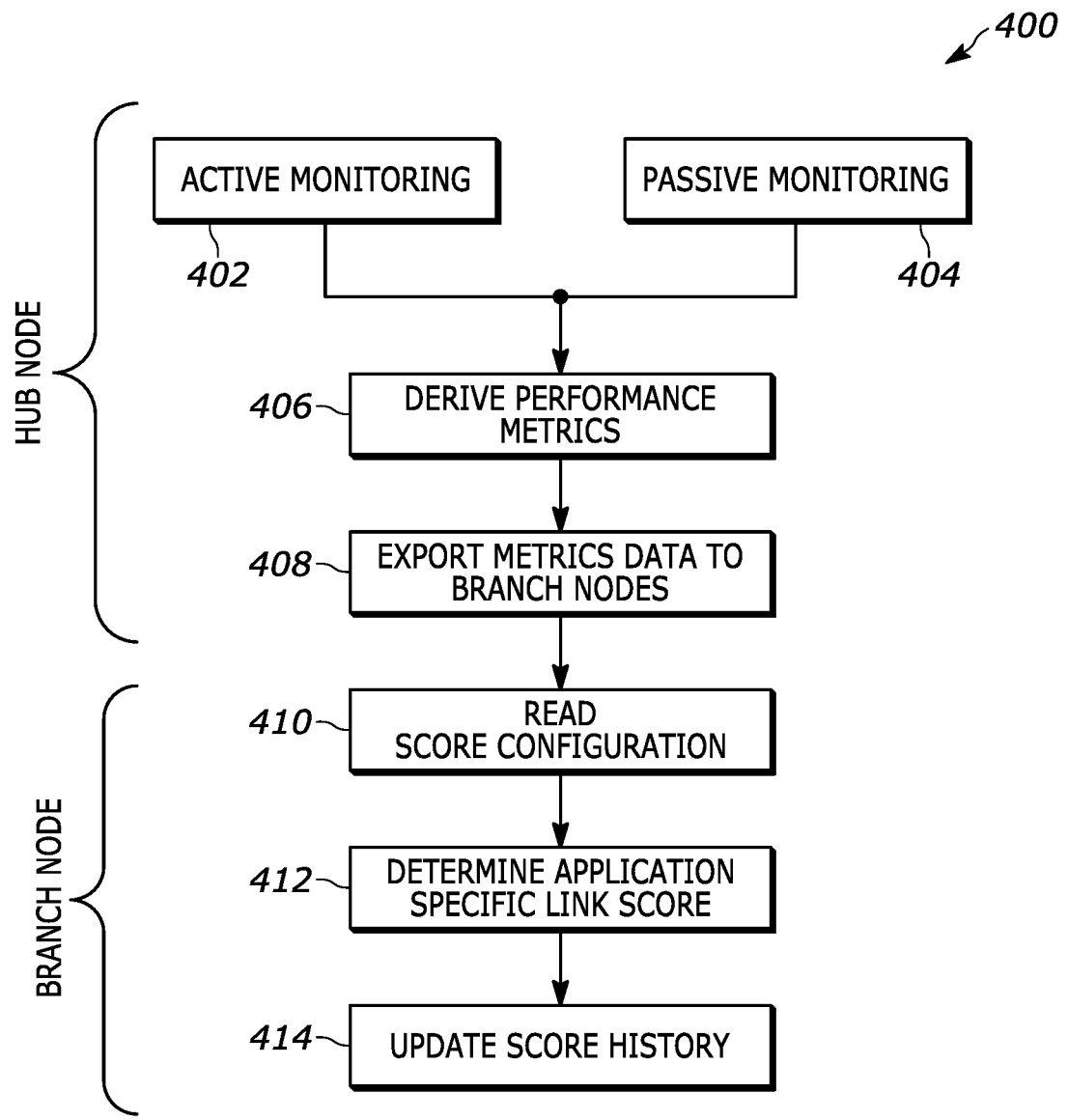
FIG. 4 is a flow chart illustrating an example of a method for scoring a link (path) for a given application, where monitoring is performed at the hub nodes, according to embodiments herein.

FIG. 4 is a flow chart illustrating an example of a method 400 for scoring a link (path) for a given application, where monitoring is performed at the hub nodes of, for example, an SD-WAN. In the example embodiment of FIG. 4, a hub node monitors the path for performance based on pre-defined metrics. The hub node may perform passive monitoring (step 402) and/or active monitoring (step 404) of the path. Subsequently, the hub node derives metrics (step 406) based on the observed performance on the path for the given application. The node exports the derived metrics to one or more branch nodes (step 408).

A branch node, which receives metric data from one or more hub nodes, reads and/or looks up a score configuration to determine a score (step 410). In an embodiment, a score configuration can include the metrics that are to be part of the score. For example, a score configuration may dictate the use of a MOS score. Alternatively, the score configuration might indicate that latency and jitter be used to compute the ALS score. Based on the score configuration, the branch node determines the application specific link score (step 412) (e.g., an ALS score for a specific application that traverses a specific path) and updates a score history (step 414) for future reference.

The various actions in method 400 may be performed in the order presented, in a different order or simultaneously. Further, in some embodiments, some actions listed in FIG. 4 may be omitted.

Figure 5:
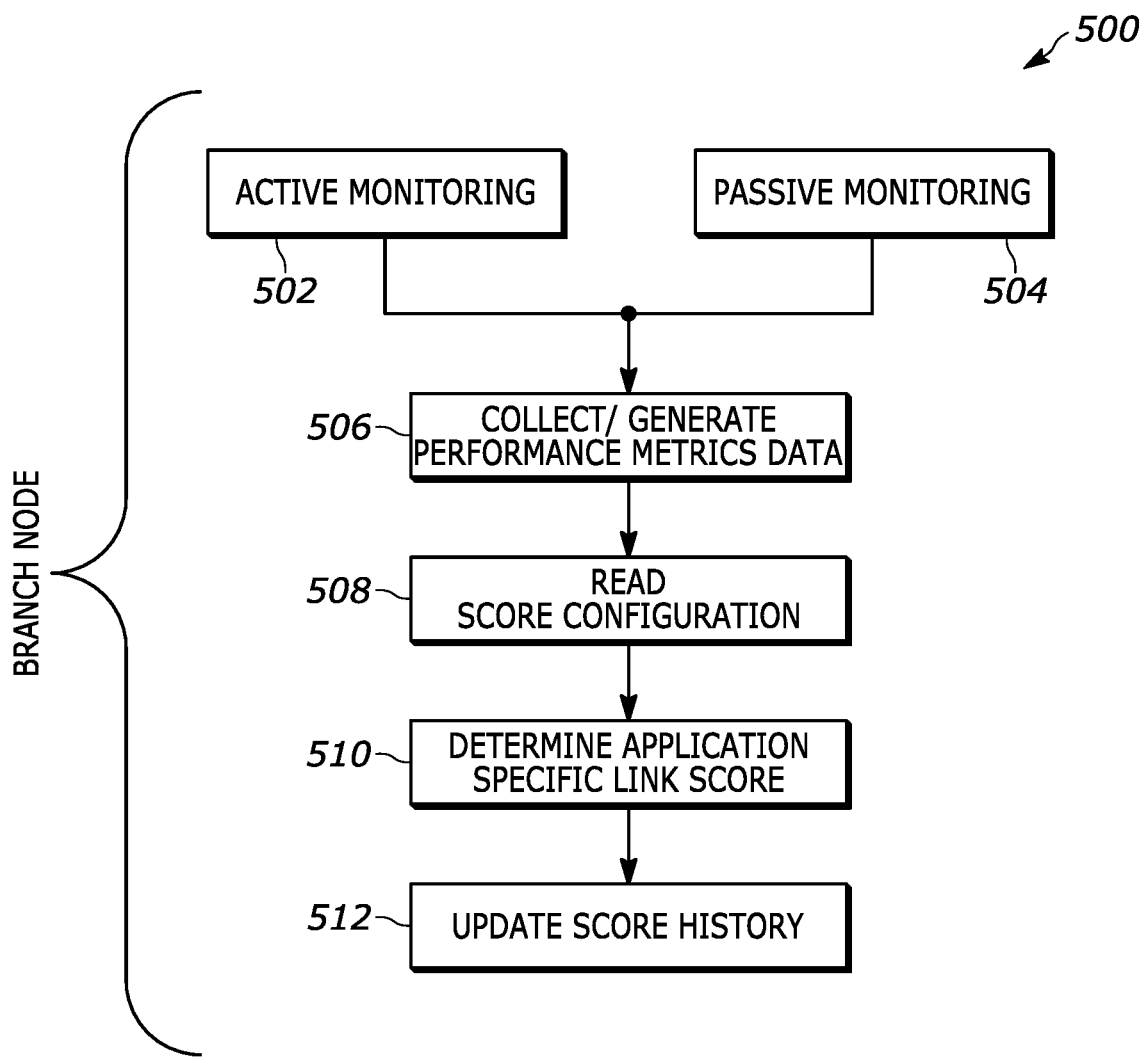
FIG. 5 is a flow chart illustrating an example of a method for scoring a link (path) for a given application, where monitoring is performed at the branch nodes, according to embodiments herein.

FIG. 5 is a flow chart illustrating an example of a method 500 for scoring a link (path) for a given application, where monitoring is performed at the branch nodes of, for example, an SD-WAN. In the example embodiment of FIG. 5, a branch node monitors the path for performance based on pre-defined metrics (e.g., the branch node collects data for particular performance metrics such as latency and packet loss on a per-application and per-path basis. The branch node may perform passive monitoring (step 502) and/or active monitoring (504) of the path. Subsequently, the branch node collects and/or generates performance metrics data (step 506) based on observed performance on the path for the given application. For example, the branch node collects performance metrics data on a per-application and per-path basis. Subsequently, the branch node reads and/or looks up a score configuration (step 508) to determine a score. Based on the score configuration, the branch node determines an application specific link score (e.g., an ALS score for a specific application that traverses a specific path) (step 510) and updates the score history (step 512) for future reference.

In various embodiments, the score configuration can be dynamic. The combination of metrics to be used in determining a score may be derived based on statistical analysis of the performance over a period of time. Determination of appropriate metrics including their relative weights can happen at pre-configured intervals or based on certain events indicating changes in the network topology/configuration. In an embodiment, the ALS score is determined as a function of packet latency and packet loss and such metric may be referred to as the "VLS score."

The various actions in method 500 may be performed in the order presented, in a different order or simultaneously. Further, in some embodiments, some actions listed in FIG. 5 may be omitted. Techniques for calculating an application link score (ALS) are described in more detail below.

Data Stores

Elements of the cache module 210 shown in FIG. 2 are described in more detail below.

Application Route Cache (ARC) (FIG. 2, 218): In an embodiment, the ARC 218 stores a near term history of all known paths for a given application along with the associated performance metrics and a score such as the ALS score or VLS score. The ARC can be used to select the best path for an application. In an embodiment, the best path is a path that has the lowest latency, the lowest packet loss, and/or the lowest economic cost, or a combination thereof. In an embodiment, entries are added to the ARC as and when performance metrics are learnt for an application session on a particular path. The server prefix for an application may be 0 or a specific prefix. The ARC can be used to maintain an ALS score for an application as a whole, as well as for an application on a per-server basis (as the application may be served by many different IP addresses).

An example ARC cache is shown Table 1 hereunder:

TABLE 1

| Application | Server Prefix | Path Descriptor |
|---|---|---|
| Office 365 | 0 | Ifindex = 1059 (paired tvi to wan1), ALS = 12311 Ifindex = 1061 (paired tvi |

TABLE 1-continued

| Application | Server Prefix | Path Descriptor |
|---|---|---|
| | | to wan2), ALS = 11112 |
| | | Ifindex = 1013(ptvi to hub1), ALS = 99131 |
| Office 365 | 13.78.120.69/32 | Ifindex = 1059 (paired tvi to wan1), ALS = 12311 |
| | | Ifindex = 1061 (paired tvi to wan2), ALS = 11112 |
| | | Ifindex = 1013(ptvi to hub1), ALS = 99131 |
| Office 365 | 13.78.120.70/32 | Ifindex = 1059 (paired tvi to wan1), ALS = 121131 |
| | | Ifindex = 1061 (paired tvi to wan2), ALS = 11142 |
| | | Ifindex = 1013(ptvi to hub1), ALS = 99100 |
| Dropbox | 0 | Ifindex = 1059 (paired tvi to wan1), ALS = 12311 |
| | | Ifindex = 1061 (paired tvi to wan2), ALS = 11112 |
| Dropbox | 13.78.120.69/32 | Ifindex = 1059 (paired tvi to wan1), ALS = 12311 |
| | | Ifindex = 1061 (paired tvi to wan2), ALS = 11112 |
| Dropbox | 108.160.160.2/32 | Ifindex = 1059 (paired tvi to wan1), ALS = 121131 |
| | | Ifindex = 1061 (paired tvi to wan2), ALS = 11142 |

Using the ARC cache as shown in Table 1, a node can lookup a list of path descriptors given a combination of application (e.g., application ID) and server prefix. A path descriptor contains information identifying a path (for example, the interface index "ifindex"), and the ALS score for that path.

In various embodiments, when metrics data corresponding to a specific server is not found, then the more generic application specific entry is used. For example, if metrics corresponding to a server 13.78.112.5 that is serving MICROSOFT OFFICE 365 traffic (referred to herein as "OFFICE365") are not found, then the generic entry corresponding to OFFICE365 (server prefix=0) could be used. This is done to select a path that gives better performance on average irrespective of the server selected.

Application Cache (AC)(FIG. 2, 212): The AC 212 is a cache used to store a mapping between (routing instance, destination IP, destination port) tuple to an application. In an embodiment, an application cache entry is created when the application is identified for a given session. An AC entry may be associated with more than one application. In an embodiment, the AC is used to identify the application for a session on the first packet, so that application specific rules (for example, based on SD-WAN policy) can be looked up without relying on deep packet inspection (DPI) based application identification, which happens later in the life of the session.

Global Domain Name Application Cache (DAC)(FIG. 2, 214): The DAC 214 is a cache used to store a mapping between DNS name and an application. A DAC entry is created when an application is detected in a data session (for example, HTTP or HTTPS session). In an example session involving an HTTP session, the domain name is obtained from the HTTP host header, and for an HTTPS session, the domain name is obtained from the Server Name Indication (SNI) field in the Secure Socket Layer (SSL) client hello field.

Client Route Cache (CRC) (FIG. 2, 216): The CRC 216 is a cache which is used to store a mapping between the (routing instance, source IP address, destination IP address) tuple and a path, (either a WAN circuit or an indirect path via a hub node). The CRC can be used to maintain path affinity for sessions initiated by a client to a specific server.

An example CRC cache mapping, which includes Virtual Route Forwarding (VRF), Client IP address, Server IP address, and Path Description, is provided hereunder in Table 2:

TABLE 2

| VRF | Client IP Address | Server IP Address | Path Descriptor |
|---|---|---|---|
| Client1-Lan1 | 192.168.20.3 | 13.12.1.34 | Ifindex = 1059 (paired tvi to wan1) |
| Client1-Lan2 | 192.168.20.3 | 13.12.1.34 | Ifindex = 1061(paired tvi to wan2) |
| Client1-Lan1 | 192.168.20.5 | 29.13.112.35 | Ifindex = 1061(paired tvi to wan2) |

Path Selection

Figure 6A:
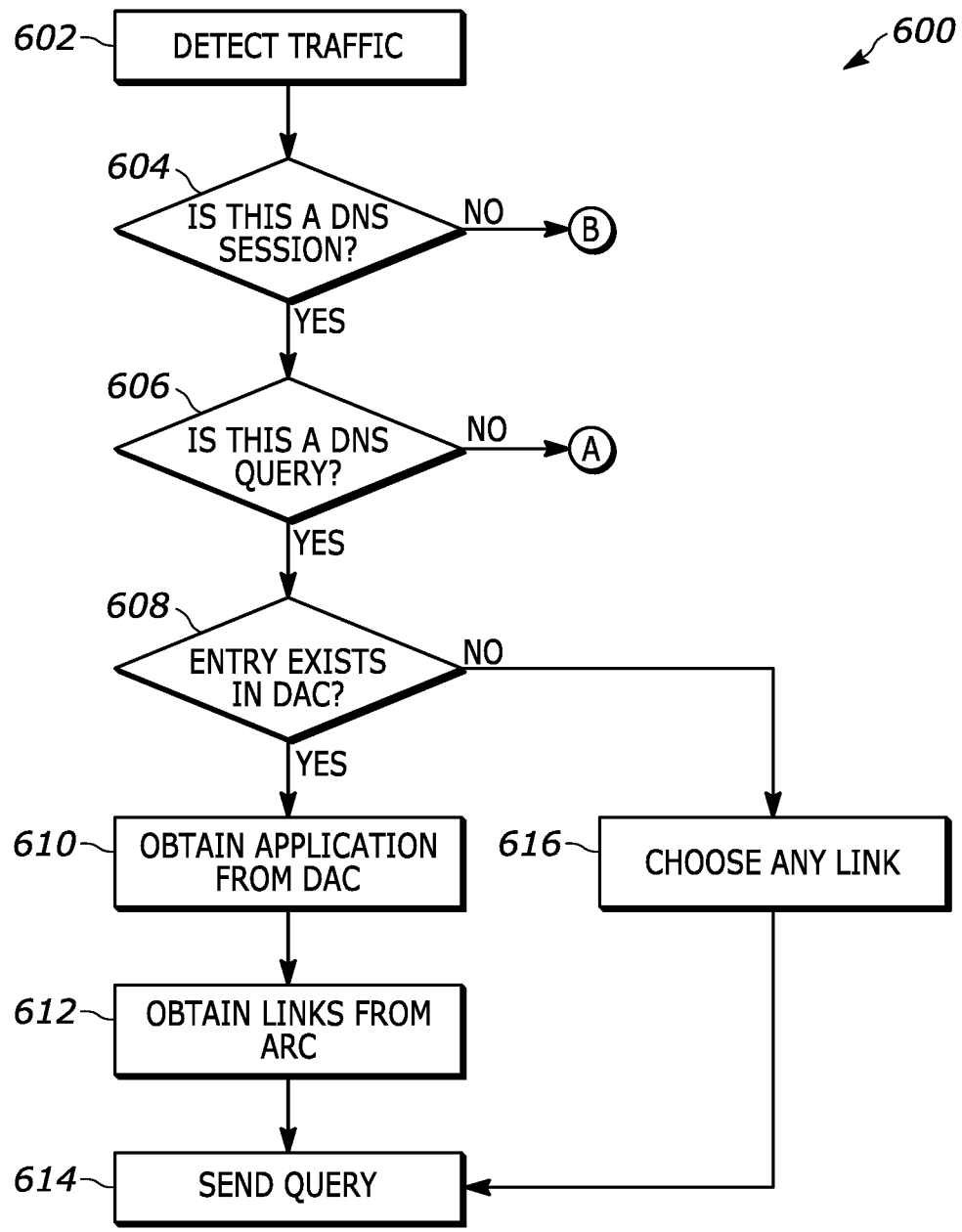
FIGS. 6A, 6B and 6C illustrate an example of a method for path selection, according to embodiments herein.

An example of a path selection process 600, as illustrated in FIG. 6A, begins with a DNS query itself. For example, traffic is detected (step 602), e.g., the application associated with the traffic is detected. If the traffic is part of a DNS session (decision point 604), then the process proceeds to decision point 606, and if not the process proceeds to "B." At decision point 606, if the traffic is part of a DNS query, then the process proceeds to decision point 608, and if not, the process proceeds to "A." If DNS path selection is configured (YES at decision point 608), the system, which may be implemented at a node such as a branch node or a hub node, looks up the application corresponding to the domain name in the DAC (step 610). Further, if an application is found in the DAC, the system looks up the ARC to determine the best path for the application (step 612), and the session is steered over that path by forwarding the query (step 614). Alternatively, if an application is not found in the DAC (NO at decision point 608), a node may choose any of the available links (step 616).

Figure 6B:
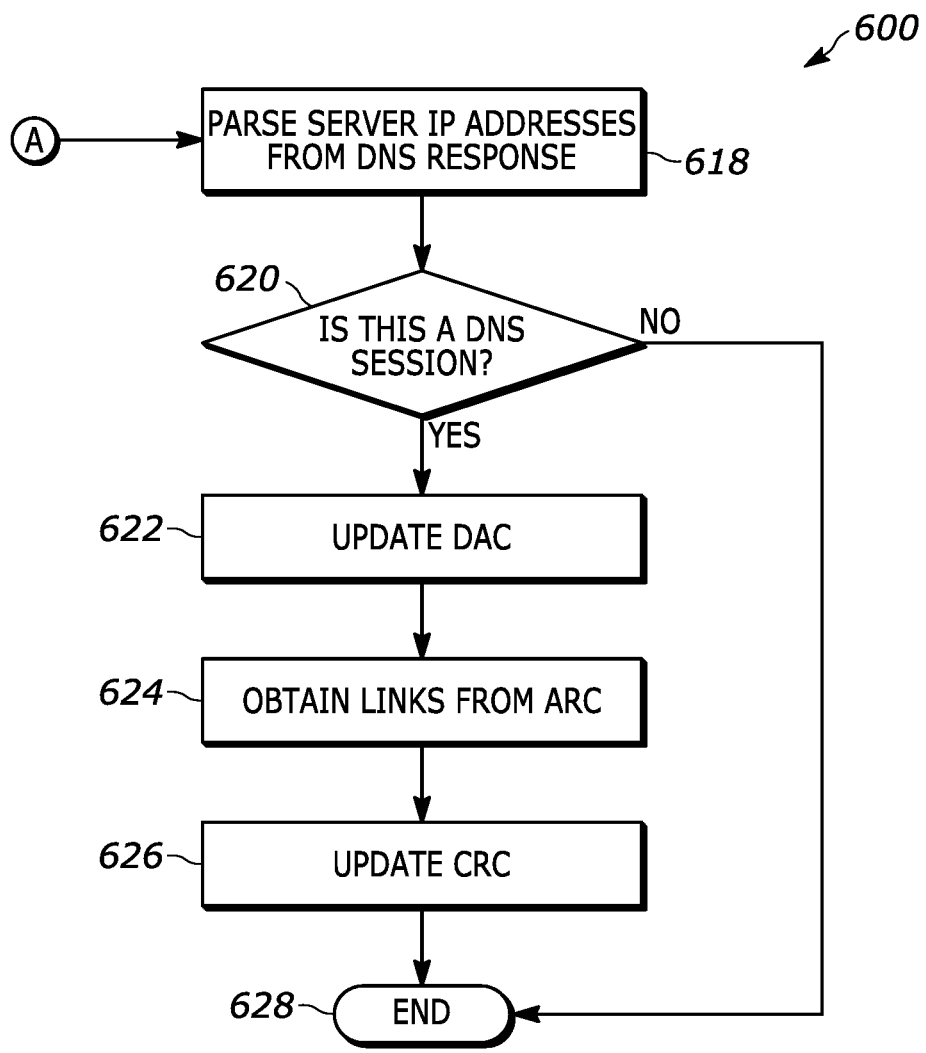

On receiving the DNS response, as illustrated in FIG. 6B, the server IP address is parsed from the DNS response (step 618), if the response is a DNS session (YES as decision point 620), then the DAC 214 is updated (step 622), and a CRC entry corresponding to the client IP address and the resolved server IP address is created and/or updated with the help of links obtained from the ARC (steps 624 and 626), pointing to the path on which the DNS query was sent. The process ends at step 628. All subsequent sessions between the client and the server IP address will be routed through the same path.

Figure 6C:
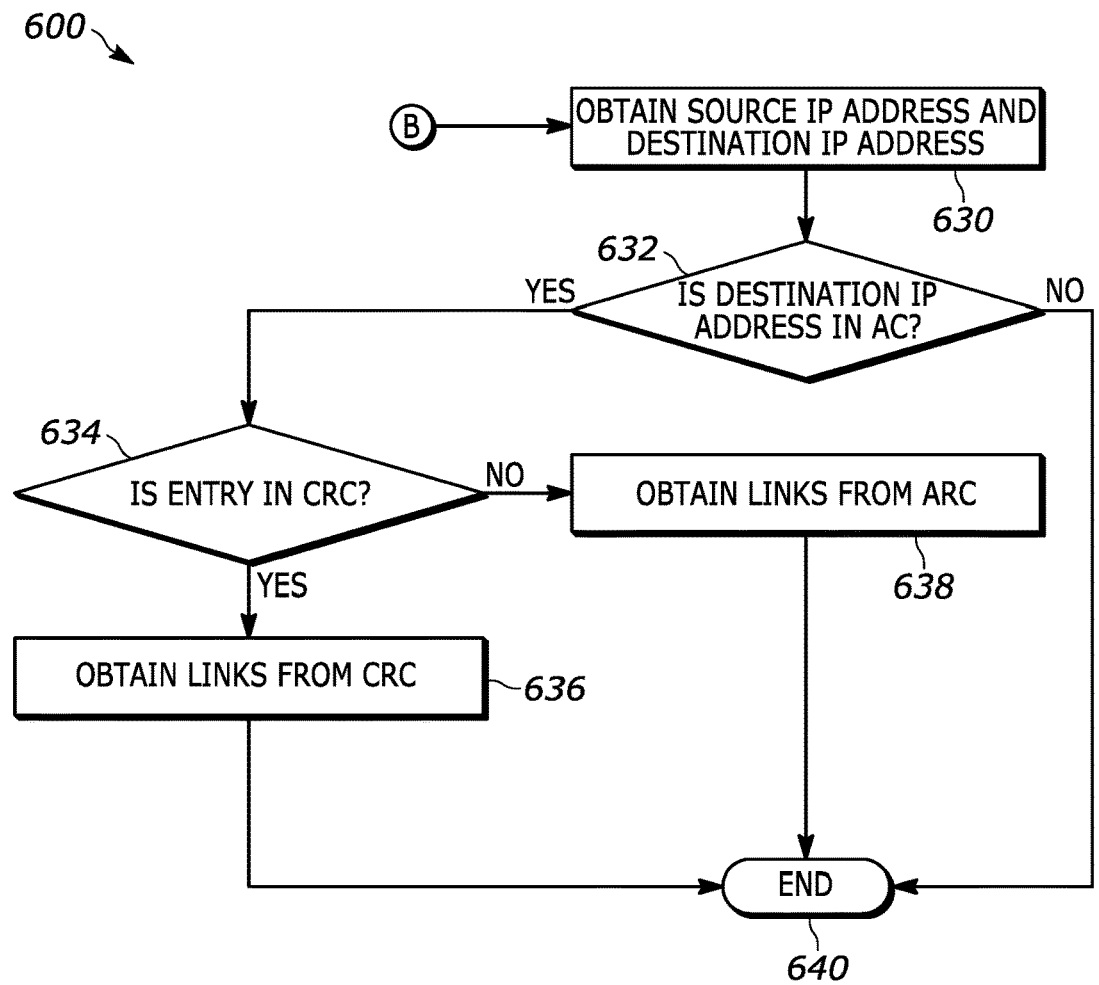

Following the DNS resolution, as illustrated in FIG. 6C, the client can initiate data sessions (for example, HTTP/ HTTPS sessions) to the server. The system can first obtain the source IP address and the destination IP address (step 630) and then can look up the destination IP address in the AC (decision point 632) to identify the application associated with the session and can use the information to implement network policy (for example, SD-WAN policy) lookup. If a corresponding entry (e.g., destination IP address) is found in the AC (YES at decision point 632), the CRC is checked (decision point 634) to determine if the session should be pinned to a previously selected path. If there is no matching CRC entry (NO at decision point 634), a path is chosen by using the ARC (step 638), and a CRC entry is created if required. If there is a matching CRC entry, links are obtained from the CRC (step 636). The process ends at step 640.

In various embodiments, the system collects passively monitored TCP metrics for auto steered sessions, either after a certain timeout, or after a certain number of packets have gone by, or at session end. These metrics are converted to an ALS score, charged to the path that the session is using, and stored in the ARC 218. This creates a near term history of application performance on a per-path basis, which is used as input for subsequent path selection decisions. In an embodiment, a certain decay is associated with the ALS score, to equalize all paths over time. In an embodiment, the worse a path is (e.g., in terms of latency and/or packet loss), the longer it takes for it to be retried.

The various actions in method 600 may be performed in the order presented, in a different order or simultaneously. Further, in some embodiments, some actions listed in FIG. 6A, FIG. 6B and FIG. 6C may be omitted.

The following paragraphs illustrate the path selection methods using an example transaction. A transaction is defined as a DNS query and the set of subsequent HTTP sessions initiated by a client. In this example, it is assumed that all the caches (AC 212, DAC 214, CRC 216, and ARC 218 corresponding to the node) are empty to begin with, and the client is attempting to access the application MICROSOFT OFFICE365 (referred to herein as "OFFICE365").

I. First Transaction

DNS request: When the very first DNS query is received from client C for the domain name outlook.office365.com, the DAC 214 is looked up at a node such as branch node 120, but will not have an entry corresponding to it. The DNS query is therefore not associated with an auto steered application and is steered according to whichever SD-WAN policy rule applies to the DNS session.

DNS response: When the DNS response is received, it resolves the domain name outlook.office365.com to IP address S (where "S" stand for server and "C" stands for client). No special action is taken at this point since the DNS session was not auto steered.

First HTTP session: When the first packet for the HTTP session is seen from C to S, the CRC 216 is looked up, but no corresponding entry is found. The session goes through a regular SD-WAN policy lookup, where the session will match a non-auto steering rule (e.g., the application associated with the session has not been identified yet) and will get steered over some path. After a few packets, the application associated with the session is identified (OFFICE365). At that time, an application cache entry mapping S to OFFICE365 will get created and entered into the AC 212.

In addition, the path selection engine 220 will also be notified when either the host header (HTTP) or the SNI (HTTPS) is discovered for the session. At this time, the corresponding domain name will be entered into the DAC 214. For example, if the SNI is outlook.office365.com, a DAC entry will be created to map outlook.office365.com with application OFFICE365.

Second HTTP session: When the first packet for the session from C to S is received, the CRC 216 will be looked up, but return no result. Next, the policy lookup will happen. Since S is already in the application cache (AC 212), the correct SD-WAN rule corresponding to OFFICE365 will be matched, and the session will be marked as an auto steered session. Therefore, a path will be looked up by consulting the ARC 218 for (OFFICE365, S). Since there are no ARC 218 entries for OFFICE365 yet, any one of the paths will be chosen, say P1. Assuming path affinity is enabled, a CRC entry will be created to pin all subsequent sessions from C to S to the path P1.

When the SNI/Host header for the session is discovered, a DAC 214 entry will be created to map outlook.office365.com to application OFFICE365.

At the appropriate time (either based on packet count or a timeout), a snapshot of the TCP metrics will be obtained for the session, converted to an ALS score such as a VLS score V, and an ARC entry will be updated for application, OFFICE365, and a server prefix for server S, to add the path P1 with metrics V.

Subsequent HTTP session(s): In an embodiment, all subsequent HTTP sessions will be identified as OFFICE365 on the first packet and will be associated with the auto steering rule. Assuming path affinity is configured, a CRC 216 lookup can be performed for (C, S). It will yield a hit, pointing to path P1 and the session will be pinned to P1. If path affinity is not configured, the ARC 218 will be consulted to pick a new path.

As can be seen from the description above, the first transaction populates all the caches (AC 212, DAC 214, CRC 216, and ARC 218 of the cache module 210 of the corresponding node 120) appropriately. This helps to perpetuate the feedback loop required for auto steering path selection.

II. Subsequent Transactions

DNS request: Client C initiates a DNS query for outlook.office365.com. The DAC 214 lookup will yield application OFFICE365, and the DNS session will match the OFFICE365 auto steering rule. If DNS auto steering is configured, the ARC 218 will be consulted to pick a path for the DNS query, say P2.

DNS response: The response resolves the name outlook.office365.com to IP address S. If path affinity is configured, the existing CRC 216 entry for (C, S) which points to path P1 will be updated to point to P2.

HTTP sessions: All HTTP sessions are identified as OFFICE365 on the first packet itself and use the ARC 218 and CRC 216 to make a path selection decision. In addition, the performance metrics for the sessions are fed back into the ARC 218 to update the near-term path performance history.

Path Affinity

In various embodiments, the nodes can maintain path affinity for a given client and server address pair. Once a path is selected for a HTTP session for a specific client and server address pair, the same path will be used for all subsequent sessions between the same pair.

Since Internet access requires source Network Address Translation (NAT), different sessions belonging to one application transaction may appear to the application server as coming from different source addresses. And, some applications may require or assume that all sessions of an application layer transaction come from the same source IP address. There may be a functional impact (for example, the application invalidating the user's session state, and forcing a re-login) when the assumption is not yet. Maintaining path affinity can be helpful.

In other embodiments, path affinity can be maintained for DNS sessions and any following data sessions.

DNS servers use complex criteria to resolve the domain to an IP address, including looking at the source IP address of the query, to determine which server can best serve the client. The criteria can include geo location (directing the client to a server that is geographically close to it) among others.

If a node (branch or hub node) consistently observes that domain name resolution by one or more DNS servers result in paths equivalent to the path selected by nodes based on performance, the node can choose to route a DNS query itself over a path known to deliver better performance, e.g., a DNS query will be translated to an application based on the domain name being queried, and the path selection engine will pick an optimal path for the application in question. Further, in various embodiments, all data traffic (for example, HTTP or HTTPS sessions initiated by a client towards the server pointed to by the corresponding DNS response) can be steered over the same path that the DNS query was sent on.

In an embodiment, path affinity is created whenever the first path selection decision is made for an application transaction, e.g., either for the DNS query (if DNS based path affinity is enabled), or for the first HTTP session. The affinity is typically associated with a timeout (e.g., set at 30 s by default). This is done to avoid keeping the session pinned to a path with degrading performance.

When a session needs to be steered over a best path, the first lookup can be done on the CRC 216. The CRC can make sure, for a predetermined period of time, that the same path will be chosen to send traffic between a set of client and server nodes. In the absence of path affinity based on the CRC, the ARC 218 can be looked up and the best performing link can be chosen.

Since a CRC 216 entry is created after an initial lookup in the ARC 218, the CRC entry represents the best performing link amongst its peers. However, since the performance of a path can degrade over time, these entries can be aged out to force an ARC lookup again. A default aging period can be 30 seconds as an example. And, in various embodiments, the aging period can be configurable.

In various embodiments, traffic is routed over the best path based on an absolute metric value that is chosen based on pre-defined metrics. In some other embodiments, traffic can be load balanced among paths that meet a pre-defined threshold for a pre-defined metric. The metric threshold can be pre-configured or can be configured by a user.

In various embodiments, a metric threshold can be dynamically and automatically adjusted by the system based on automatic trending/baselining. For example, during peak usage hours, all paths are likely to be overloaded. Based on predictive analysis, a metric threshold can be adjusted accordingly to accommodate for such fluctuations.

In various embodiments, the path selection mechanisms disclosed herein can adjust to changing network conditions by switching end-host/client connections mid-stream to a better performing path.

Switching end-host/client connections for TCP applications presents a problem since a switching path involves a source address translation for the connection using a different IP address (the one corresponding to the new path). In an embodiment, this problem can be addressed by an application level proxy at the node performing the path selection. The proxy can relay the end host's connection and can relay the end host's connection on a connection to the application server. Upon detecting a better performing path to the application server, the node can then re-establish a new connection to the application server without impacting the end host. Such an application level proxy would be effective for applications that maintain session state which is independent of the underlying TCP (or any other transport) connection. An example embodiment would be for HTTP downloads using the Accept Ranges feature.

Example Configuration of a Node (e.g., Branch Node or Hub Node)

An example configuration is provided herein in the context of an SD-WAN network topology. However, the nature of configurations can be applied to other contexts as well.

Auto steering a SaaS application through path selection is configured using an SD-WAN policy rule. The rule match condition can contain one or more applications from a set of predefined SaaS applications. Auto steering is enabled by associating the rule with a forwarding profile with the next hop selection method automatically set to automat. Additionally, one or more next hops can be specifically configured to constrain the path selection to only those next hops.

The following example configurations assume the following:

A branch node has 3 WAN interfaces, wan1, wan2, and wan3.

The default route in the LAN virtual router (VR) is an Equal-cost Multi-path (ECMP) route, one from each WAN VR.

OFFICE365 traffic should breakout locally and be auto steered using routing only.

DROPBOX traffic should breakout locally and be auto steered over wan1 and wan2.

All other internet bound traffic should breakout locally using wan2 as the primary and wan1 as the backup.

All important SD-WAN site-to-site traffic should use wan1 as the primary and wan2 as the backup All unimportant SD-WAN site to site traffic should use wan2 as primary and wan1 as backup.

An example of a configuration of a node used to address the above use case is as follows:

---
SD-WAN Interfaces
---

```
wan - interfaces {
    vni - 0 / 2.0 {
        circuit - type Broadband;
        transport - domains[txa];
        inet {
            circuit - name wan1;
        }
    }
    vni - 0 / 3.0 {
        circuit - type Broadband;
        transport - domains[txb];
        inet {
            circuit - name wan2;
        }
    }
    vni - 0 / 4.0 {
        circuit - type Broadband;
        transport - domains[txa];
        inet {
            circuit - name wan3;
        }
    }
}
```

Reachability Monitors

Monitors are used for brownout detection on WAN interfaces. The monitors can be attached to routing policies and forwarding profile next hops. When a monitor goes down, routing policy can withdraw associated routes (default route from a WAN VR, for example), and SD-WAN policy can take associated next hops out of rotation.

```
monitor {
    monitor-wan1 {
        interval 1;
        type icmp;
        source-interface vni - 0 / 2.0;
        ip-addresses[8.8.8.8];
    }
```

SD-WAN Forwarding Profiles

```
        monitor-wan2 {
            type icmp;
            source-interface vni-0/3.0;
            ip-addresses[8.8.8.8];
        }
        monitor-wan3 {
            type icmp;
            source-interface vni-0/4.0;
            ip-addresses[8.8.8.8];
        }
    } fp-o365 {
    nexthop-selection-method automatic;
}
fp-dropbox {
    nexthop-selection-method automatic;
    nexthop-priorities {
        priority 1 {
            nh-wan1 {
                network wan1;
                monitor monitor-wan1;
            }
            nh-wan2 {
                network wan2;
                monitor monitor-wan2;
            }
        }
    }
}
fp-other-internet {
    nexthop-priorities {
        priority 1 {
            nh-wan2 {
                network wan2;
                monitor monitor-wan2;
            }
        }
        priority 2 {
            nh-wan1 {
                network wan1;
                monitor monitor-wan1;
            }
        }
    }
}
fp-b2b-important {
    sla-profile slap1;
    circuit-priorities {
        priority 1 {
            circuit-names {
                local[wan1];
            }
        }
        priority 2 {
            circuit-names {
                local[wan2 wan3];
            }
        }
    }
    connection-selection-method weighted-round-robin;
    evaluate-continuously enable;
    recompute-timer 10;
}
fp-b2b-unimportant { // unimportant sdwan vpn traffic
    circuit-priorities {
        priority 1 {
            circuit-names {
                local[wan2 wan3];
            }
        }
        priority 2 {
            circuit-names {
                local[wan1];
            }
        }
    }
    connection-selection-method weighted-round-robin;
    evaluate-continuously enable;
    recompute-timer 10;
}
```

SD-WAN Policy Rules

```
rule - o365 {
    match {
        source {
            zone {
                zone - list[zone - lan];
            }
        }
        application {
            predefined - application - list[OFFICE365];
        }
    }
    set {
        forwarding - profile fp - o365;
    }
}
rule - dropbox {
    match {
        source {
            zone {
                zone - list[zone - lan];
            }
        }
        application {
            predefined - application - list[DROPBOX];
        }
    }
    set {
        forwarding - profile fp - dropbox;
    }
}
rule - other - internet {
    match {
        source {
            zone {
                zone - list[zone - lan];
            }
        }
        destination {
            address {
                address - list[vpn - addresses];
                negate;
            }
        }
    }
    set {
        forwarding - profile fp - other - internet;
    }
}
rule - b2b - important {
    match {
        source {
            zone {
                zone - list[zone - lan];
            }
        }
        application {
            predefined - application - list[HTTP HTTPS];
        }
    }
    set {
        forwarding - profile fp - b2b - important;
    }
}
rule - b2b - unimportant {
    set {
        forwarding - profile fp - b2b - unimportant;
    }
}
```

Global Configuration

The following settings are configurable globally (for example, for a tenant):

```
sd-wan app-steering {
    timeout {
        app-metrics 60;
        client-route-cache 120;
    }
    session-pinning {
        domain-app-cache true;
        client-route-cache true;
    }
}
```

The embodiments disclosed herein can be implemented through at least one software program running on at least one hardware device and performing network management functions to control the network elements. The network elements shown in FIG. 1 and FIG. 2 include blocks which can be at least one of a hardware device, or a combination of hardware device and software module.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Figure 7:
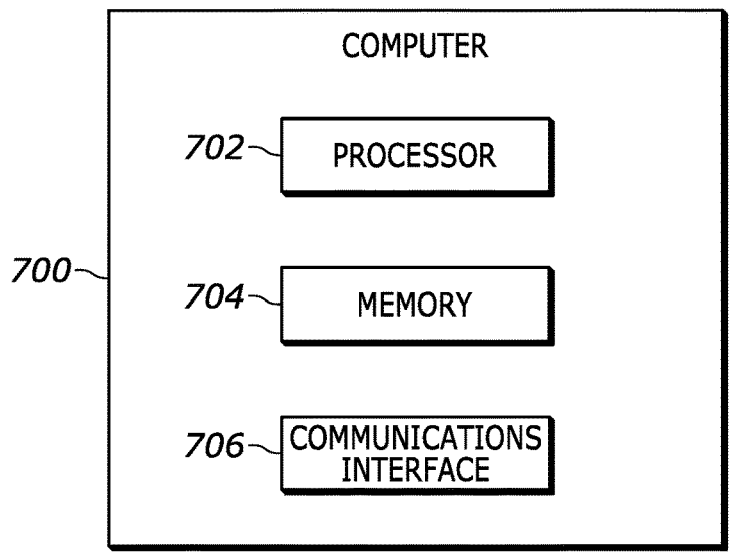
FIG. 7 depicts a computer that includes a processor, memory, and a communications interface.
Figure 8A:
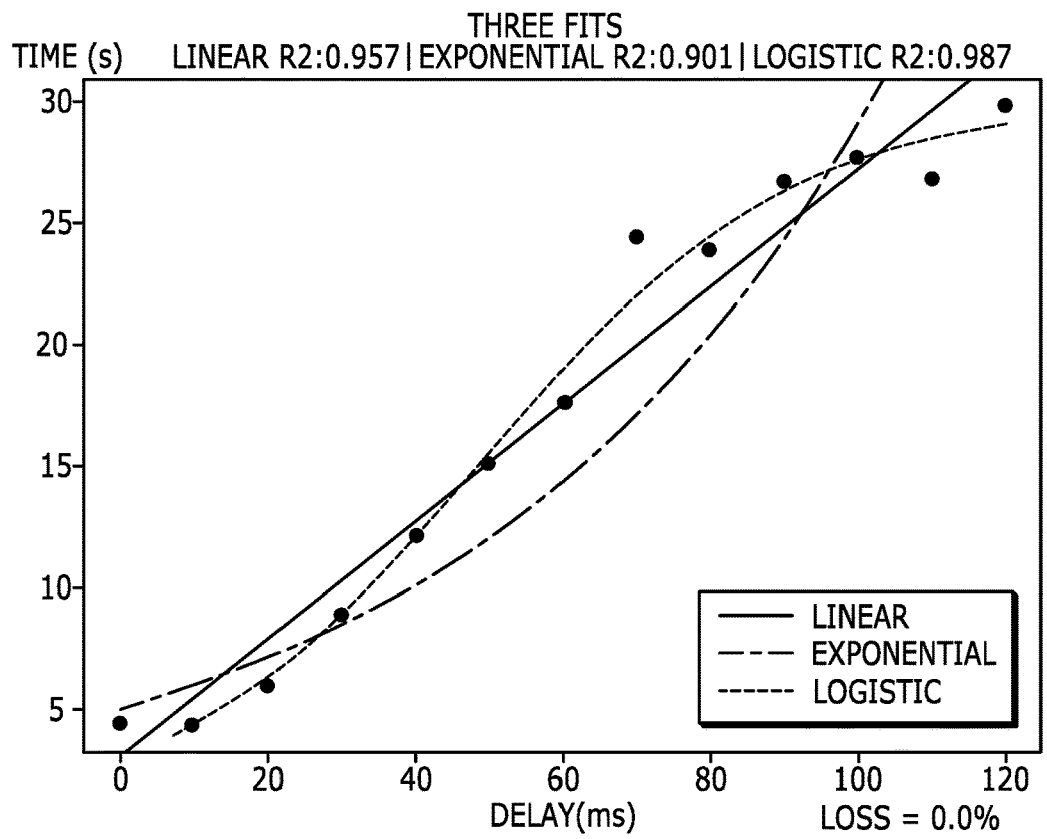
FIGS. 8A-8D are example graphs of time versus delay for downloading a 250 MB file for four different loss values.
Figure 8B:
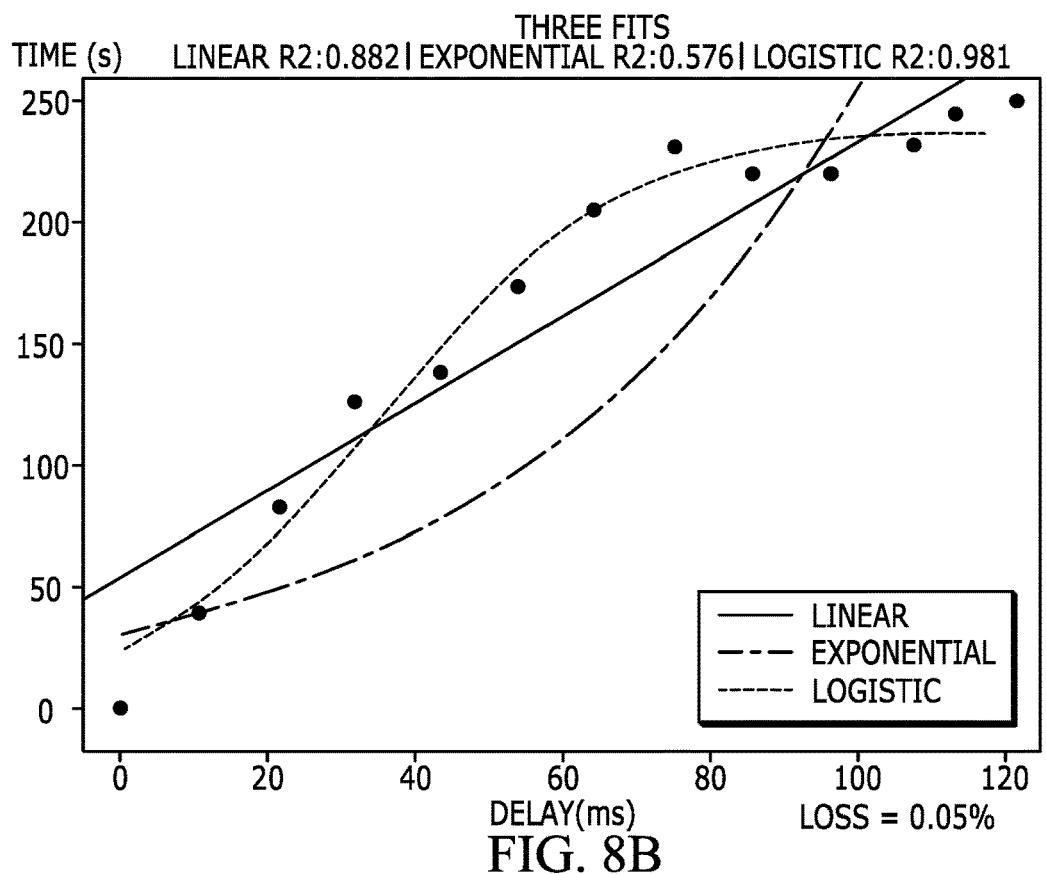
Figure 8C:
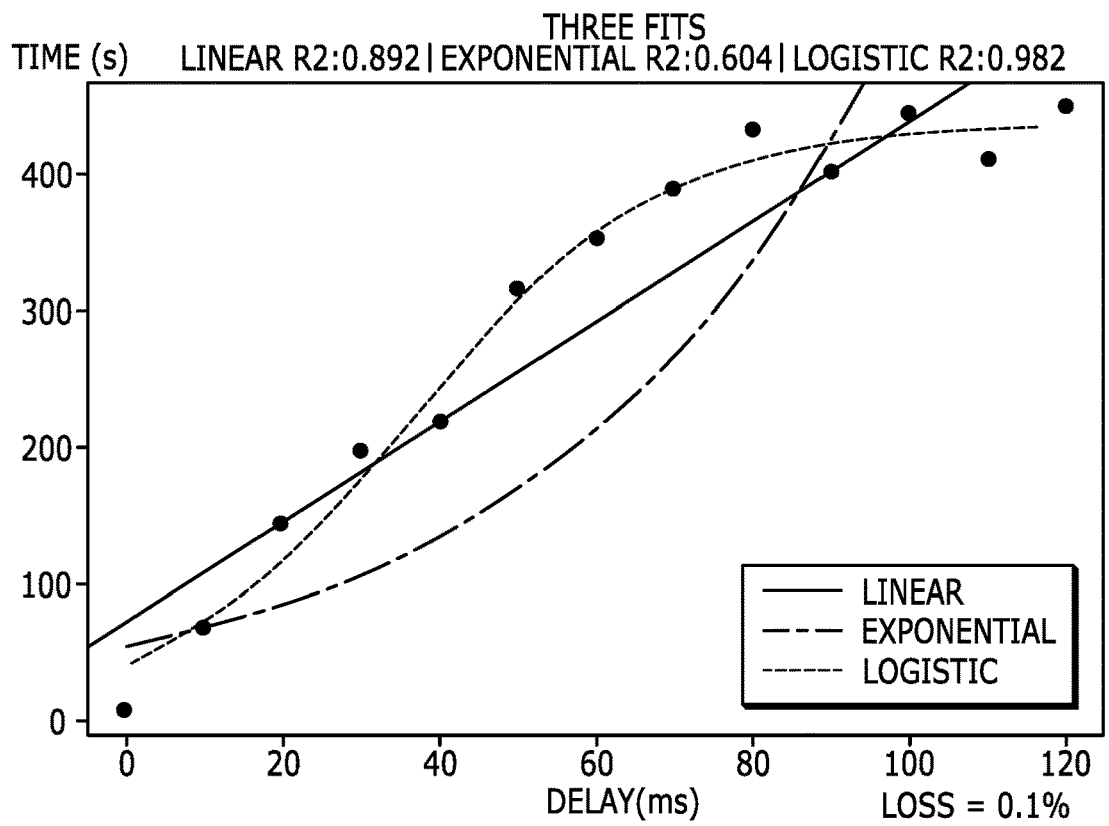
Figure 8D:
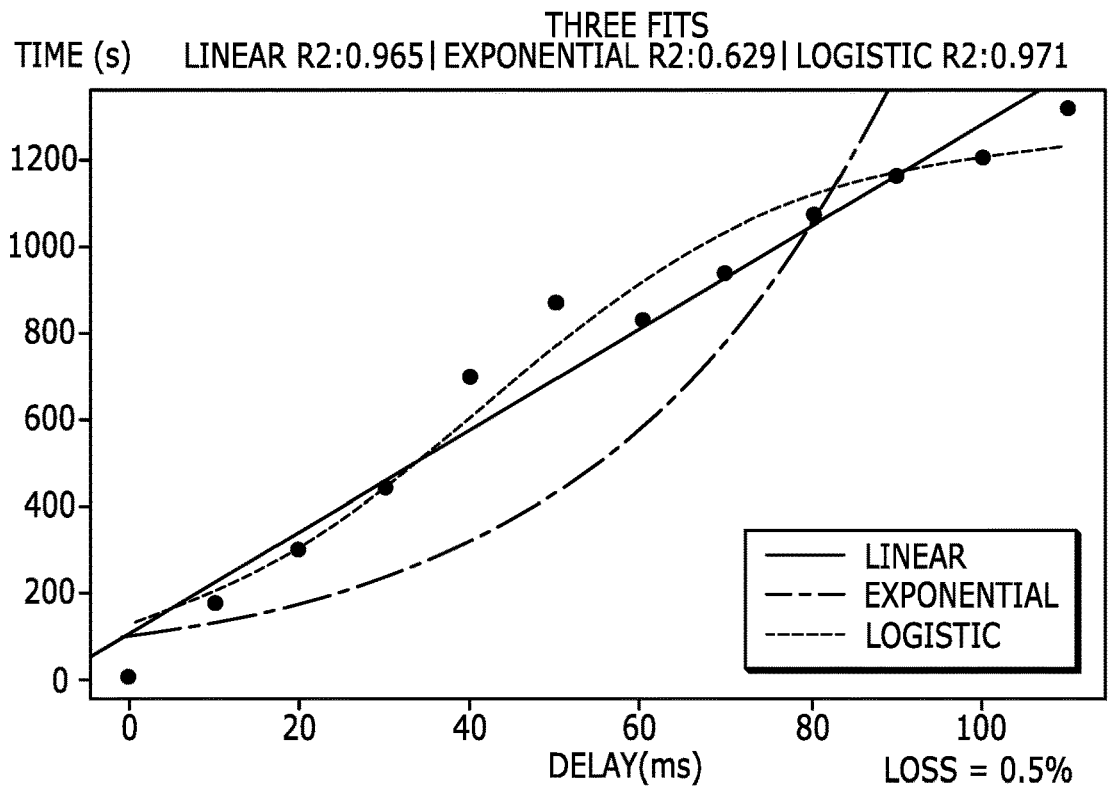
Figure 9A:
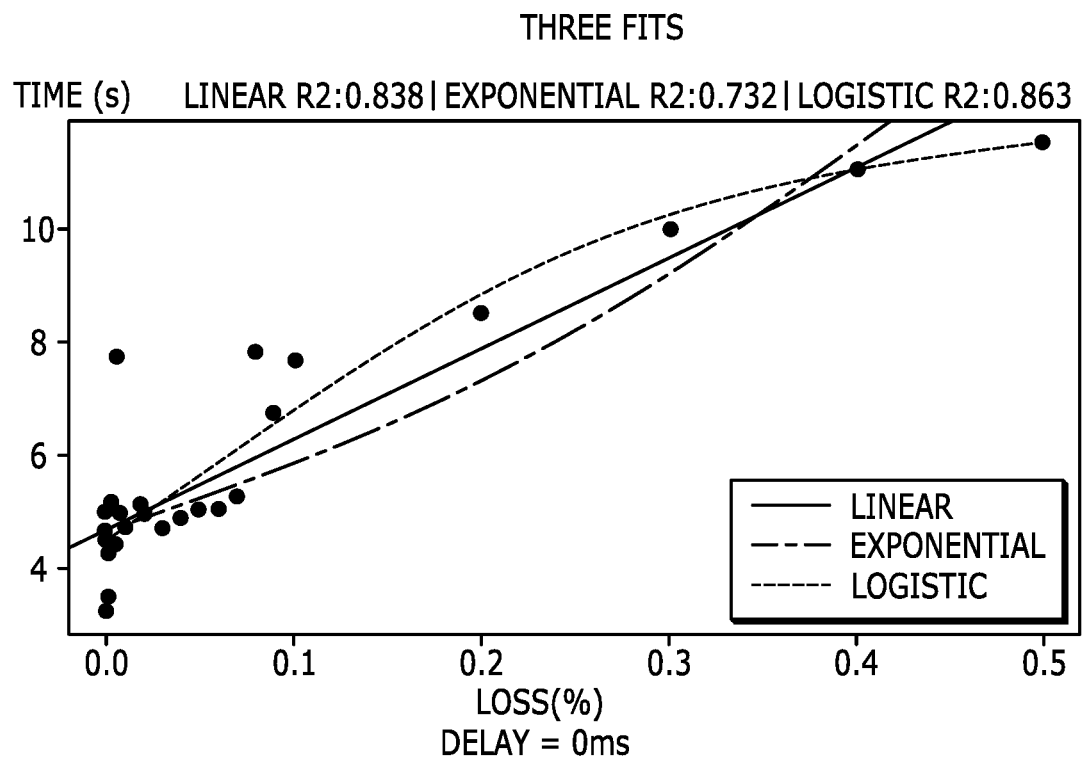
FIGS. 9A-9D are example graphs of time versus loss for downloading a 250 MB file for four different delay values.
Figure 9B:
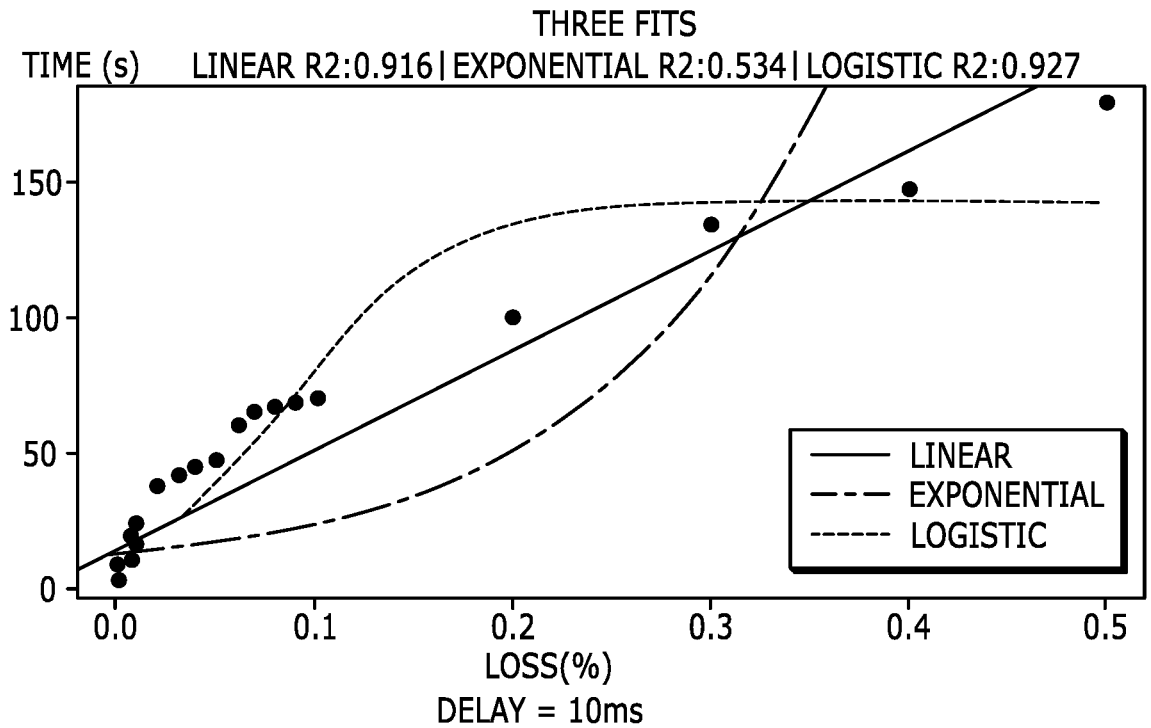
Figure 9C:
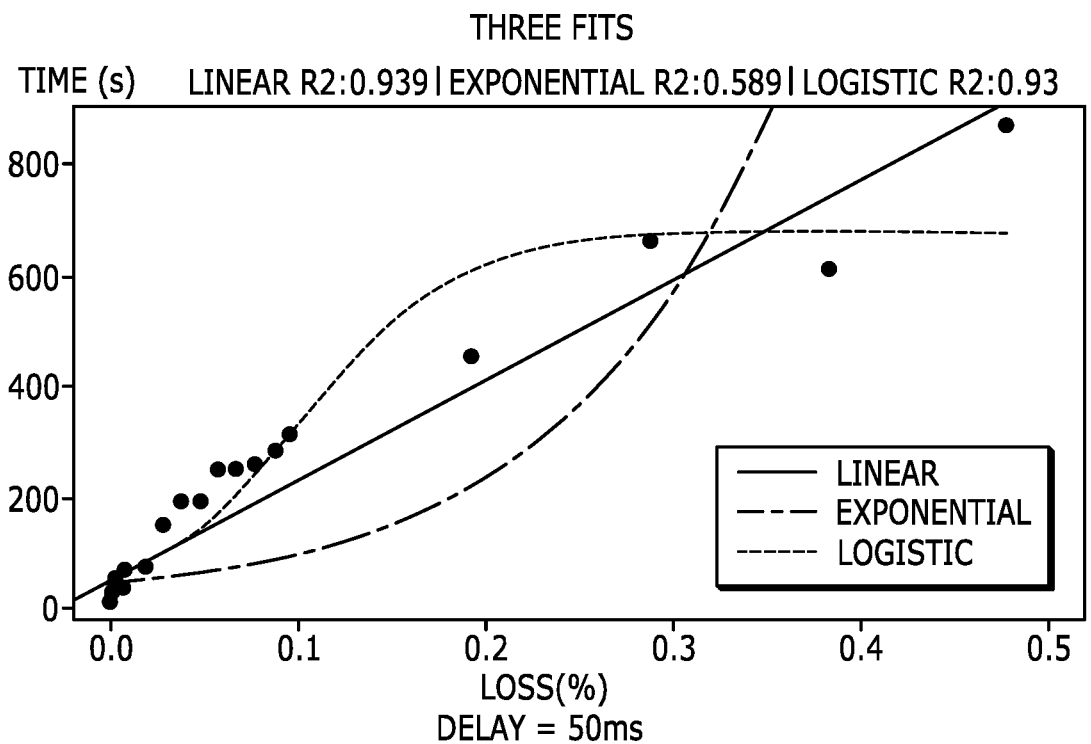
Figure 9D:
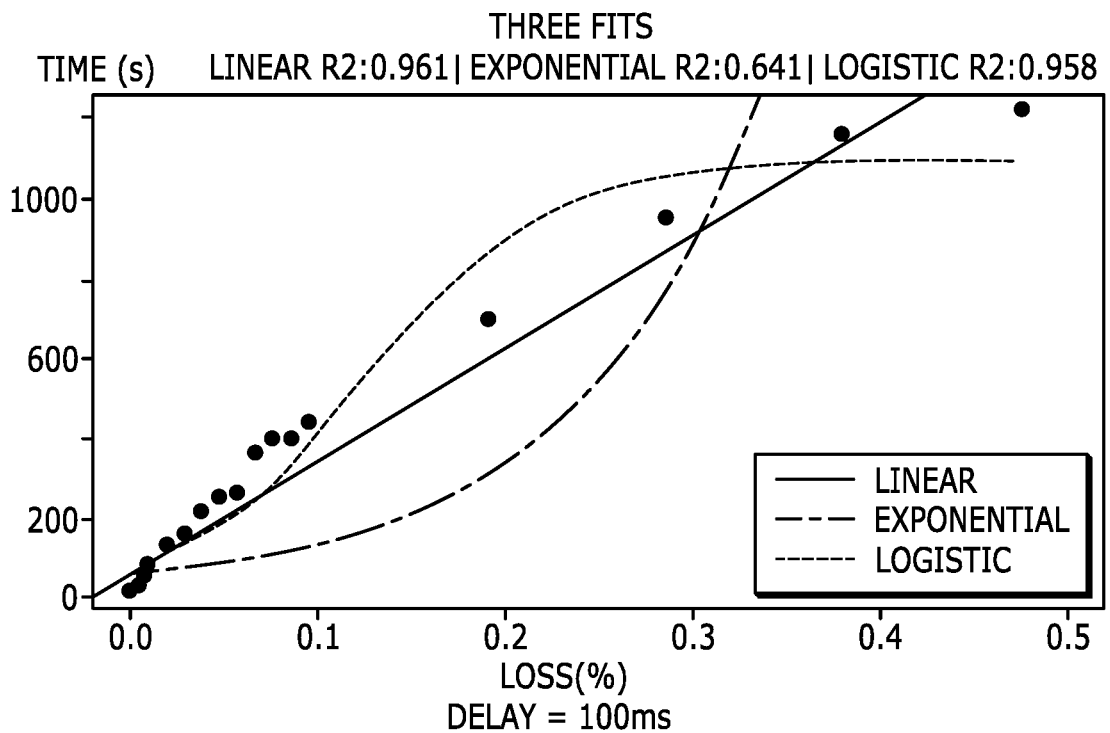

In an embodiment, the functionality described herein is performed by a computer device that executes computer readable instructions (software). FIG. 7 depicts a computer 700 that includes a processor 702, memory 704, and a communications interface 706. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Link Scoring and Link Ranking Using Dynamic Metrics

In an embodiment, the health of a system (e.g., the quality/performance of paths through an SD-WAN to reach a hosted application) is a function of time and therefore time is an important variable in defining an application link score (ALS). Delay, loss, and jitter are common factors that determine the quality/performance of a link and/or path. Various reviews of popular business applications (including business applications that are provided through a SaaS model) show that of the most popular business applications (e.g., the top twenty-five most used), only a few of the business applications involve live video (e.g., video conferencing applications), which may be sensitive to jitter. Therefore, it has been realized that jitter may not be as important of a factor in characterizing the quality/performance of a link (e.g., via an application link score (ALS)) as delay and loss. Consequently, it has been realized that it is desirable to characterize the performance of a link (e.g., via an application link score (ALS)) as a function $f$ such that:

$$f(Delay, Loss) = Time \quad \text{Equation (1)}$$

Assuming delay and loss are independent variables, time as a function of delay and time as a function of loss can be plotted separately while keeping the other variable constant.

FIGS. 8A-8D are example graphs of time versus delay for downloading a 250 MB file for four different loss values (e.g., loss percentages), where the time corresponds to the time required to download the 250 MB file and the delay corresponds to the time for a packet to travel across the path between a client terminal and an application host computer (e.g., in an SD-WAN environment). FIGS. 9A-9D are example graphs of time versus loss for downloading a 250 MB file for four different delay values (e.g., delay in milliseconds), where the time corresponds to the time required to download the 250 MB file and loss corresponds to the percentage of packets lost during the file download (e.g., in an SD-WAN environment). As shown in FIGS. 8A-8D and 9A-9D, the time taken to download a fixed length file (e.g., a 250 MB file) is plotted to illustrate the individual relationships between loss and delay.

Using analytical tools (e.g., the "R" analytical tool from the "R Project for Statistical Computing" tool), it has been determined that in the relevant environment, time can be effectively modeled as a logistic function of loss and delay (e.g., packet loss and packet delay). In an embodiment, an equation for a curve was obtained using, for example, the "R" analytical tool. In an embodiment, an upper limit of the function was arbitrarily set by relating the upper limit to an amount of time that a user can tolerate to download a fixed length file (e.g., for experimental purposes, the upper limit for a download of a 250 MB file was set at 12 hours).

In an embodiment, time is directly equated to an application link score (ALS). Although the time it takes for a data transfer can, and most probably will, vary based on the topology of a particular network, the relative values of time will still hold, e.g., will still provide an indication of the quality of a link or path through a network relative to other links or paths through the same network. In an embodiment, the estimated time is referred to as the application link score (ALS). Further, packet loss observed on a link based on a retransmission ratio (RTX) can also be computed. In an embodiment, modeling the time it takes to download a 250 MB file involved varying the delay/latency and loss percentage of a network. The values obtained from the model when transferring the 250 MB file is the time it takes to download the file and the number of packets retransmitted. A retransmission ratio (RTX) can be determined from the number of packets retransmitted/total number of packets transmitted. When trying to characterize a network (e.g., a link or path through a network), the loss percentage may not be known, but time is a function of delay and loss, therefore, the retransmission ratio is a direct function of loss. Hence, time is a function of delay/latency and the retransmission ratio (RTX).

In an embodiment, the following model was developed to calculate an application link score (ALS):

$$\text{Application Link Score } (ALS) = V * \frac{e^{lp}}{1 + e^{lp}} \quad \text{Equation (2)}$$

where Linear Predictor, lp=A+B*Delay+C*RTX+D*Delay*RTX (Equation (3)), V is a measurement constant that corresponds to the upper time limit, Delay corresponds to the time taken to transmit a packet across a network (e.g., via a link or path) from one node to another (e.g., from a client device to an application host computer), RTX corresponds to a retransmission ratio (e.g., number of packets retransmitted via a corresponding TCP connection/session divided by the total number of packets transmitted via the TCP connection/session), and A, B, C, and D are constants.

For the specific example file size (e.g., 250 MB) and assumed upper limit (e.g., 12 hours=43,200 seconds=4.32× $10^6$ milliseconds), an example of the linear predictor model is as follows:

$$lp = -7.151200 + 0.011821*Delay + 4.669700*Loss + 0.012558*Delay*Loss \qquad \text{Equation (4)}$$

where, V=43,200 seconds*100 milliseconds/second=4.32*$10^6$ milliseconds and RTX(f)=loss, where loss is a ratio of packets lost to packets transmitted.

Using the above-identified equations to calculate the application link score (ALS), the application link score can vary from 0 to 4,320,000. In an embodiment, relatively low application link scores indicate that the corresponding links have relatively more desirable delay and loss characteristics (e.g., lower packet delay and lower packet loss) and relatively high application link scores indicate that the corresponding links have relatively less desirable delay and loss characteristics (e.g., higher packet delay and higher packet loss). Although the range of 0 to 4,320,000 milliseconds lends itself well to internal computation by a path selection engine of a node, the range does not lend itself well to a human analyst who might want to also use the application link score (ALS) as an absolute indicator of the link health (e.g., a characterization of link quality). In an embodiment, the application link score (ALS) is converted to a value (e.g., referred to herein as an application link rank (ALR)) that is in a more humanly digestible range. For example, a rank is restricted to the range of 0-100, where a rank of "0" is the best or untested rank and a rank of "100" is the worst rank. For example, a good ranking (e.g., a low ALR of, for example, less than 50) corresponds to a high quality link with respect to time (e.g., as a function of delay and loss) and a poor ranking (e.g., a high ALR of, for example, greater than 50) corresponds to a low quality link with respect to time (e.g., as a function of delay and loss). The following function breaks the range of 0-4,320,000 (e.g., the measurement constant, V) into one-hundred separate bins as follows:

$$V * \frac{C^{ALS} - 1}{C^{100} - 1} \quad \forall x \in [0, 100] \qquad \text{Equation (5)}$$

where ALS is the application link score, C=a constant that determines the shape of the curve's knee and consequently the distribution of scores into the bins. Although in the example of Equation (5), the number of bins is set to 100, in other embodiments, the number of bins, nBins, may be different.

In an embodiment, it has been found through observation that a value of C=1.06 exhibited a desired performance although other values of C are possible. In an embodiment, it is desirable to align the rankings with user expectations. Thus, it is assumed that a difference in download times of 1 second versus 10 seconds for a 250 MB file will have a significant effect on user experience, but a difference in download times of 10 hours versus 12 hours for a 250 MB file will have little effect on user experience. Therefore, a constant, C, that causes the application link rank (ALR) to change more rapidly with time (e.g., ALS) on the lower end of the scale (e.g., closer to the "0" end of the scale) and change less rapidly with time (e.g., ALS) on the upper end of the scale (e.g., closer to the "4,320,000" end of the scale) is desirable in this application. For example, in the case of 100 bins, application link scores (ALSs) may be distributes as:

ALS=0-10: ALR=0
ALS=11-100: ALR=1
ALS=101-1000: ALR=2
. . .
ALS=2,000,000-4,320,000: ALR=100

Using the above example approach, the number of application link scores that fit into each bin increases exponentially. Now, given an application link score (ALS) (e.g., for a particular path for traffic to travel through an SD-WAN to access a particular hosted application), and using the inverse of the function above (Equation (5)), an application link rank (ALR) (e.g., the bin in which the application link score belongs) can be expressed as:

$$ALR = \log\left(\left(\frac{ALS}{V}\right)*(C^{100} - 1) + 1\right) \Big/ \log(C) \qquad \text{Equation (6)}$$

where ALS=application link score, V=measurement constant, and C=the constant that determines the shape of the curve's knee and consequently the distribution of scores into the bins.

In an embodiment, the application link rank (ALR) is provided as an output (e.g., on a display or on a report) that can be viewed by an network analyst to evaluate the quality of a link or path in a network such as an SD-WAN.

Obtaining Direct Internet Access (DIA) Metrics

In the case of direct Internet access traffic egressing via a local breakout path (e.g., paths that can access an application directly over the Internet without passing through a hub node of an SD-WAN). For each TCP connection/session that is executed, statistics including the SYN-SYN-ACK (e.g., TCP three-way handshake) roundtrip time and the retransmitted packets in either or both directions can be obtained. In various embodiments, the SYN-SYN-ACK time can be used as the connection delay and the maximum retransmission ratio (either in the forward or the reverse direction) can be used as the actual retransmission ratio (e.g., RTX) to compute the application link score (ALS). In an embodiment, the connection delay and retransmission information can be obtained by the path selection engine (FIG. 2, 220) from a software library that obtains the information from a Transport Layer (Layer 4) software element (e.g., from the TCP layer). In an embodiment, the TCP connection/session delay can be used for the "delay" in Equations (3) or (4) and the maximum retransmission ratio can be used for the "RTX" in Equations (3) or (4).

Using the application link score (ALS) calculated as described above to quantify link quality (e.g., for operations such as link/path selection) works well when a large number of packets are transmitted (e.g., a large number of packets from the same client to the same application host over the same link or path in an SD-WAN), and the retransmission ratio is stable enough to give a stable application link score. However, if a session (e.g., a TCP connection/session) is short lived, the retransmission ratio may not be as reliable of an indicator of link quality. For example, in some instances, the initial packet drops are not representative of packet drops that may occur during the entire session. In typical networks, connections (e.g., TCP connections) are more or less stable, and 5 packet drops out of the initial 10 packet transmissions, does not necessarily mean that 50 packets will be dropped out of 100 packet transmissions. To deal with the issue of short lived sessions, a number of packet transmissions (e.g., 100 packet transmissions) is set as a number of packets that gives high confidence (e.g., 100% confidence) on the retransmission ratio. If the number of packet transmissions in the computation is less than 100, then the retransmission ratio (RTX) is linearly scaled down by a confidence ratio according to:

$$\text{Confidence ratio } \phi = \frac{\#packets}{100} \quad \text{if packets} < 100 \qquad \text{Equation (7)}$$
$$1 \quad \text{if packets} \geq 100$$

where "#packets"=number of packets transmitted (e.g., on a current TCP session) and "packets"=number of packets transmitted. Thus, according to the confidence ratio, if the number of packets transmitted in a particular TCP session is greater than or equal to 100, then the confidence ratio is 1 and if the number of packets transmitted in the TCP session is less than 100, then the confidence ratio is scaled by #packets/100. Although a value of 100 is set as the threshold (confidence threshold) for the confidence ratio, the confidence threshold could be set at more or less than 100. In an embodiment, the confidence threshold is set at a high enough number that a loss of a few packets (e.g., 1-10 packets) early on in a TCP session does not unnecessarily reduce the confidence ratio.

Using Service Level Agreement Metrics to Calculate Application Link Score (ALS)

Figure 10:
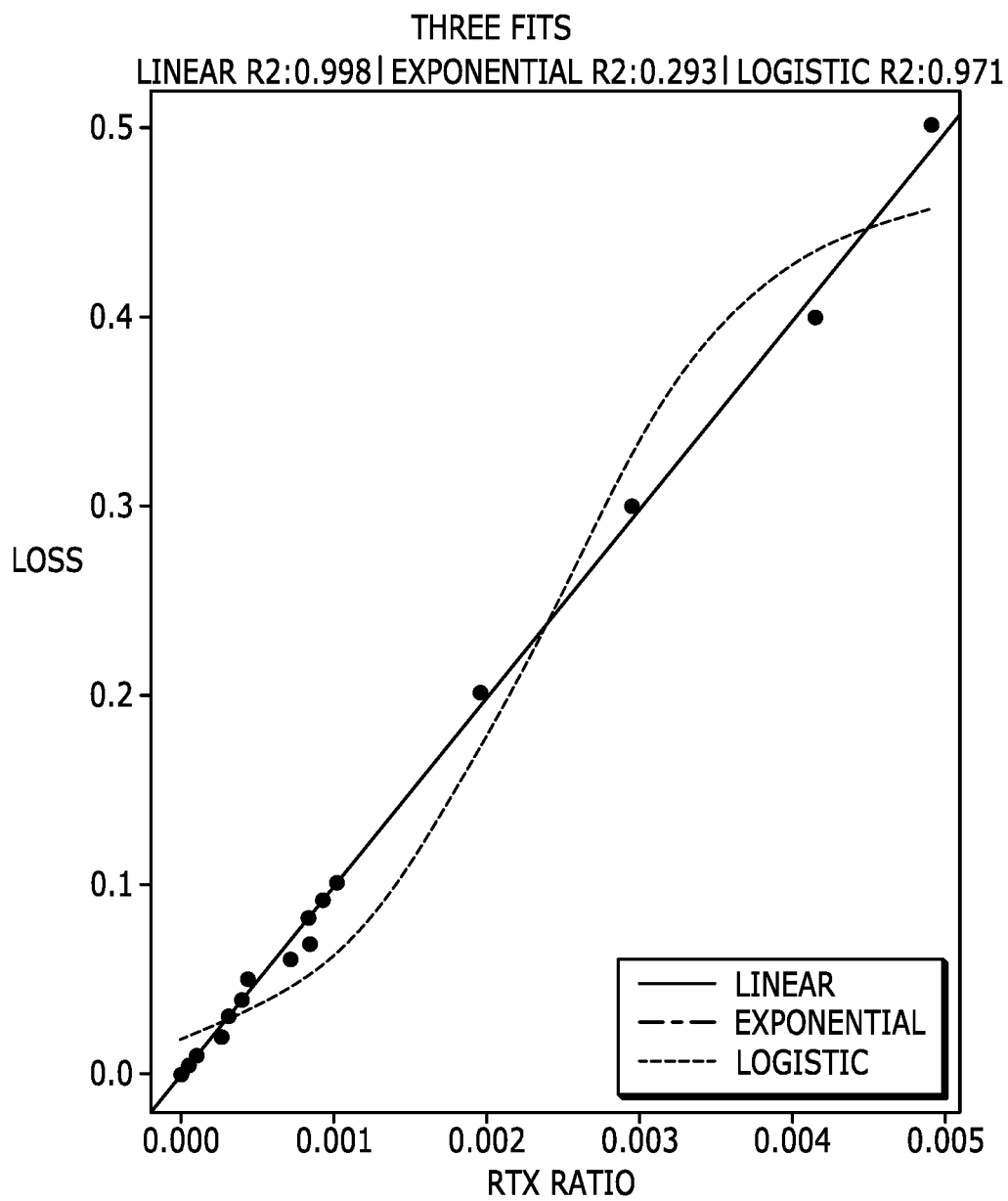
FIG. 10 is a graph of loss ratio and retransmission ratio for an experimental data set that shows linear, exponential, and logistic fits.

In an embodiment, metrics that are monitored as part of a service level agreement (SLA) for branch to branch communications provide access to parameters such as delay and loss ratio (e.g., packets lost/total packets transmitted for traffic tied to a particular SLA). Thus, in an embodiment, information collected as part of an SLA can be used to calculate the application link score (ALS). In the case where the application link score (ALS) is calculated as a function of delay and retransmission ratio as identified above with respect to equations (2)-(4), the loss ratio as collected for SLA monitoring is converted to a retransmission ratio. FIG. 10 is a graph of loss ratio and retransmission ratio for an experimental data set that shows linear, exponential, and logistic fits. As indicated in FIG. 10, a strong linear relationship exists between loss ratio and retransmission ratio. In an example, the conversion factor generated by the example model is expressed as:

$$RTX = \frac{\text{Loss Ratio}}{98.4579} \qquad \text{Equation (8)}$$

where 98.4579 is an example linearity value that reflects the linear relationship that exists between the loss ratio and the retransmission ration. The above-identified equation can be used to calculate the retransmission ratio (RTX) from a loss ratio, which can subsequently be used to calculate the application link score (ALS) (e.g., Equations (2)-(4)) for use in path selection between branches.

Combining MultiPath Metrics

In some cases, traffic through a network such as an SD-WAN (e.g., between a client device and an application host) may include traversing multiple different links or paths. When traversing multiple different links or paths, e.g., $P_1, P_2, \ldots, P_n$, for which raw metrics are available, it is possible to calculate an application link score (ALS) for the apparent path, $P_x$, by combining individual raw metrics. In an embodiment, the delays are additive, e.g., the time taken on path, $P_x$, is the sum of delays on individual paths, e.g., $P_1, P_2, \ldots, P_n$, and the cumulative delay, $D_x$, for path $P_x$ can be expressed as:

$$D_x = D_1 + D_2 + \ldots + D_n, \qquad \text{Equation (9)}$$

Additionally, if $L_1$ is the probability that traffic gets dropped on path $P_1$, then $(1-L_1)$ is the probability that traffic does not get dropped on path $P_1$. By extension, the probability that the traffic successfully traverses all the paths on combined path, $P_x$, e.g., $P_1, P_2, \ldots, P_n$, can be expressed as:

$$1-L_x=(1-L_1)(1-L_2)\ldots(1-L_n) \rightarrow L_x=1-(1-L_1)(1-L_2)\ldots(1-L_n) \qquad \text{Equation (10)}$$

In an embodiment, an application link score (ALS) for the combined path $P_x$ (e.g., $P_1, P_2, \ldots, P_n$) can be calculated using $D_x$ for the "delay" in equations (3) and (4) and $L_x$ for the loss in equations (3) and (4). In particular, the loss, $L_x$, is used to calculate the retransmission ratio (RTX), and the delay, $D_x$, and the retransmission ratio (RTX) are used to calculate the application link score (ALS) (e.g., Equation (2)), and the application link score (ALS) is used for path selection, e.g., path selection for a client to reach a hosted application via an SD-WAN.

Combining Multiple Metrics

When there are multiple metrics for a same path, it is possible to use an exponentially weighted moving average (EWMA) to combine the metrics. In an embodiment, the latest (e.g., most recent) metrics are weighted more heavily.

Metric Age-Out

As described above, TCP metrics are typically passively collected and used, and therefore there is no automated timer-based way of updating the metrics. In such scenarios, it is possible to associate a timeout with each metric (e.g., an expiration time). For example, once an application link score (ALS) is computed for a particular path, the application link score (ALS) ages out to zero according to its timeout.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for selecting a path to an application through a Software-Defined Wide Area Network (SD-WAN), the method comprising:
    monitoring available paths through the SD-WAN to reach a hosted application to obtain performance metrics associated with the available paths through the SD-WAN on a per-application and per-path basis;
    generating an application link score for a combination of the hosted application and an available path through the SD-WAN for the available paths through the SD-WAN, wherein the application link score is generated as a function of packet delay and packet loss; and
    selecting a path for traffic to travel through the SD-WAN to access the hosted application based on application link scores corresponding to the available paths through the SD-WAN;
    wherein the application link scores are calculated using a logistic function; and
wherein the application link scores are generated as:

$$\text{Application Link Score } (ALS) = V * \frac{e^{lp}}{1 + e^{lp}}$$

where Linear Predictor, lp=A+B*Delay+C*RTX+D*Delay*RTX,

V is a measurement constant that corresponds to an upper time limit, Delay corresponds to a time for a packet to travel across the available path, RTX corresponds to a retransmission ratio, and A, B, C, and D are constants.

2. The method of claim 1, wherein V=4,320,000 milliseconds.

3. The method of claim 2, wherein:

lp=−7.151200+0.011821*Delay+4.669700*Loss+ 0.012558*Delay*Loss.

4. The method of claim 1, further comprising calculating an application link rank that is a function of the application link score and the measurement constant, V.

5. The method of claim 4, wherein the application link rank is calculated as:

$$ALR = \log\left(\left(\frac{ALS}{V}\right) * (C^{nBins} - 1) + 1\right) \Big/ \log(C)$$

where C is a constant and nBins is a number of bins.

6. The method of claim 1, further comprising scaling RTX by:

$$\text{Confidence ratio } \phi = \frac{\#packets}{ConfThresh} \quad \text{if packets} < ConfThresh$$
$$1 \quad \text{if packets} \geq ConfThresh$$

wherein #packets is a number of packets transmitted on a TCP session and ConfThresh is a confidence threshold in number of packets.

7. The method of claim 1, wherein the Delay and the retransmission ratio (RTX) are obtained from Transmission Control Protocol (TCP) session information.

8. The method of claim 1, wherein the delay and loss ratio information is collected from service level agreement (SLA) monitoring and wherein the application link scores are calculated using the delay and the loss ratio information collected from the SLA monitoring.

9. The method of claim 1, wherein the delay and the loss ratio information is collected from service level agreement (SLA) monitoring and wherein the RTX is calculated as:

$$RTX = \frac{\text{Loss Ratio}}{LV}$$

where a Loss Ratio is packets lost/total packets transmitted and an LV is the linearity value.

10. A non-transitory computer readable medium that stores computer readable instructions, that when executed on one or more processors, implements a method for selecting a path to an application through a Software-Defined Wide Area Network (SD-WAN), the method comprising:
    monitoring available paths through the SD-WAN to reach a hosted application to obtain performance metrics associated with the available paths through the SD-WAN on a per-application and per-path basis;
    generating an application link score for a combination of the hosted application and an available path through the SD-WAN for the available paths through the SD-WAN, wherein the application link score is generated as a function of packet delay and packet loss; and
    selecting a path for traffic to travel through the SD-WAN to access the hosed application based on application link scores corresponding to the available paths through the SD-WAN;
    wherein the computer readable instructions, when executed on the one or more processors, implement the method, wherein the application link scores are calculated using a logistic function; and
    wherein the computer readable instructions, when executed on the one or more processors, implement the method, wherein the application link scores are generated as:

$$\text{Application Link Score } (ALS) = V * \frac{e^{lp}}{1 + e^{lp}}$$

where Linear Predictor, lp=A+B*Delay+C*RTX+ D*Delay*RTX, V is a measurement constant that corresponds to an upper time limit, Delay corresponds to a time for a packet to travel across the available path, RTX corresponds to a retransmission ratio, and A, B, C, and D are constants.

11. The non-transitory computer readable medium of claim 10, wherein the computer readable instructions, when executed on the one or more processors, implement the method further comprising calculating an application link rank that is a function of the application link score and the measurement constant, V.

12. The non-transitory computer readable medium of claim 11, wherein the computer readable instructions, when executed on the one or more processors, implement the method, wherein the application link rank is calculated as:

$$ALR = \log\left(\left(\frac{ALS}{V}\right) * (C^{nBins} - 1) + 1\right) \Big/ \log(C)$$

where C is a constant and nBins is a number of bines.

13. The non-transitory computer readable medium of claim 10, wherein the computer readable instructions, when executed on the one or more processors, implement the method further comprising scaling RTX by:

$$\text{Confidence ratio } \phi = \frac{\#packets}{ConfThresh} \quad \text{if packets} < ConfThresh$$
$$1 \quad \text{if packets} \geq ConfThresh$$

wherein #packets is a number of packets transmitted on a TCP session and ConfThresh is a confidence threshold in number of packets.

14. The non-transitory computer readable medium of claim 10, wherein the computer readable instructions, when executed on the one or more processors, implement the method, wherein the Delay and the retransmission ratio (RTX) are obtained from Transmission Control Protocol (TCP) session information.

15. The non-transitory computer readable medium of claim 10, wherein the computer readable instructions, when executed on the one or more processors, implement the method, wherein the delay and the loss ratio information is collected from service level agreement (SLA) monitoring and wherein the application link scores are calculated using the delay and loss ratio collected from the SLA monitoring.

16. A method for selecting a path to an application through a network, the method comprising:
monitoring available paths through a network to reach a hosted application to obtain performance metrics associated with the available paths through the network on a per-application and per-path basis;
generating an application link score for a combination of the hosted application and an available path through the network for the available paths through the network, wherein the application link score is generated as a function of packet delay and packet loss; and
selecting a path for traffic to travel through the network to access the hosted application based on application link scores corresponding to the available paths through the network;
wherein the application link scores are calculated using a logistic function; and
wherein the application link scores are generated as:

$$\text{Application Link Score } (ALS) = V * \frac{e^{lp}}{1 + e^{lp}}$$

where Linear Predictor, lp=A+B*Delay+C*RTX+ D*Delay*RTX, V is a measurement constant that corresponds to an upper time limit, Delay corresponds to a time for a packet to travel across the available path, RTX corresponds to a retransmission ratio, and A, B, C, and D are constants.

* * * * *